US007929071B2

(12) United States Patent
Hirano et al.

(10) Patent No.: US 7,929,071 B2
(45) Date of Patent: Apr. 19, 2011

(54) ELECTRIC FIELD GENERATING DEVICE COMPRISING AN ELECTRIC FIELD GENERATING RESISTOR AND LINE ELECTRODES, LIGHT DEFLECTING DEVICE HAVING THE SAME, AND IMAGE DISPLAY APPARATUS HAVING THE SAME

(75) Inventors: Yukiko Hirano, Kanagawa (JP); Toshiaki Tokita, Kanagawa (JP); Koh Fujimura, Tokyo (JP); Yumi Matsuki, Kanagawa (JP); Toshimichi Hagiya, Chiba (JP); Takanobu Osaka, Kanagawa (JP); Masanori Kobayashi, Kanagawa (JP); Yohei Takano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1037 days.

(21) Appl. No.: 11/684,742

(22) Filed: Mar. 12, 2007

(65) Prior Publication Data

US 2007/0216316 A1 Sep. 20, 2007

(30) Foreign Application Priority Data

Mar. 14, 2006 (JP) ................................ 2006-068683
Dec. 27, 2006 (JP) ................................ 2006-350754

(51) Int. Cl.
*G02F 1/335* (2006.01)
*G02F 1/136* (2006.01)
*G09K 19/02* (2006.01)

(52) U.S. Cl. ............................ 349/49; 349/53; 349/172

(58) Field of Classification Search .................... 349/49, 349/53, 171, 172
See application file for complete search history.

(56) References Cited

U.S. PATENT DOCUMENTS

| | | | | |
|---|---|---|---|---|
| 6,919,982 | B2 * | 7/2005 | Nimura et al. | |
| 7,038,835 | B2 * | 5/2006 | Matsuki et al. | |
| 7,489,383 | B2 | 2/2009 | Sugimoto et al. | |
| 2003/0098945 | A1 * | 5/2003 | Sugimoto et al. | 349/172 |
| 2006/0039068 | A1 * | 2/2006 | Tokita et al. | |
| 2006/0055993 | A1 * | 3/2006 | Kobayashi et al. | |
| 2006/0119927 | A1 * | 6/2006 | Matsuki et al. | |
| 2006/0209295 | A1 * | 9/2006 | Sugimoto et al. | |

FOREIGN PATENT DOCUMENTS

| | | |
|---|---|---|
| JP | 2003-90992 | 3/2003 |
| JP | 2003-98502 | 4/2003 |
| JP | 2004-101704 | 4/2004 |
| JP | 2004-286938 | 10/2004 |
| JP | 2004-287092 | 10/2004 |
| JP | 2005-338804 | 12/2005 |
| JP | 2006-145664 | 6/2006 |
| JP | 2006-267906 | 10/2006 |

* cited by examiner

*Primary Examiner* — Mark A Robinson
*Assistant Examiner* — Charles Chang
(74) *Attorney, Agent, or Firm* — Oblon, Spivak, McClelland, Maier & Neustadt, L.L.P.

(57) ABSTRACT

A disclosed electric field generating device includes an electric field generating unit including a substrate, line electrodes, and an electric field generating resistor and configured to generate an electric field. In the disclosed electric field generating device, the line electrodes are formed on at least one side of the substrate in parallel with each other so as to divide the side of the substrate into multiple sections; the electric field generating resistor is shaped like a strip and positioned so as to touch a part of each of the line electrodes; and some of the line electrodes have connectors for electric connection.

16 Claims, 11 Drawing Sheets

ELECTRIC FIELD GENERATING DEVICE COMPRISING AN ELECTRIC FIELD GENERATING RESISTOR AND LINE ELECTRODES, LIGHT DEFLECTING DEVICE HAVING THE SAME, AND IMAGE DISPLAY APPARATUS HAVING THE SAME

BACKGROUND OF THE INVENTION

1. Field of the Invention

The present invention generally relates to an electric field generating device, a light deflecting device, and an image display apparatus, and more particularly relates to an electric field generating device that forms in-plane electric fields by using potential gradients generated when an electric current is passed through a resistor, a light deflecting device that deflects light by using the electric field generating device, and an image display apparatus such as a projection display or a head-mounted display that includes the light deflecting device.

2. Description of the Related Art

Patent document 1 discloses an image display apparatus with a wide viewing angle. In the disclosed image display apparatus, the arrangement of liquid crystal molecules is changed by electric fields formed along the plane of an electrode substrate to achieve the wide viewing angle. In a light deflecting device used in the disclosed image display apparatus, parallel line electrodes are provided on the surface of one of two transparent substrates with a liquid crystal layer sandwiched between them. On the outside of the disclosed light deflecting device, multiple resistors for dividing the voltage supplied from a power supply are provided. The line electrodes are connected to connecting points between the resistors so that different voltages are applied to the line electrodes. The potential differences between the line electrodes generate electric fields between the line electrodes along the plane of the transparent substrate and thereby generate potential gradients in the liquid crystal layer. Thus, according to patent document 1, potential gradients are forcibly generated in the liquid crystal layer to obtain comparatively uniform electric field strengths throughout the disclosed light deflecting device.

Patent document 2 discloses a light deflecting device in which a dielectric layer made of a dielectric material such as glass or resin is provided between a liquid crystal layer and the surface of a substrate where line electrodes are formed to reduce discontinuous electric potential distribution and thereby to make electric fields in the liquid crystal layer substantially uniform.

[Patent document 1] Japanese Patent Application Publication No. 2004-286938

[Patent document 2] Japanese Patent Application Publication No. 2003-98502

A disadvantage of the light deflecting device disclosed in patent document 1 is that it is necessary to make the distance between the line electrodes longer to increase the effective area of the light deflecting device, and the longer distance makes it difficult to make electric fields between the line electrodes uniform. Especially, the directions and strengths of electric fields near the midpoint between the parallel line electrodes become non-uniform, making it difficult to achieve uniform optical deflection.

As described above, in the light deflecting device disclosed in patent document 1, a voltage is divided by the multiple resistors on the outside and the divided voltages are supplied to the line electrodes to generate electric fields along the plane of the transparent substrate. Because the resistors are provided on the outside, the size of the disclosed light deflecting device tends to become larger.

In the light deflecting device disclosed in patent document 2, a dielectric layer is provided between a liquid crystal layer and the surface of a substrate where line electrodes are formed to reduce discontinuous electric potential distribution and thereby to make electric fields in the liquid crystal layer substantially uniform. A disadvantage of the disclosed light deflecting device is that when the light deflecting device is activated, although it reduces diffraction of transmitted light, it may cause scattering of light and thereby dramatically decrease the contrast.

SUMMARY OF THE INVENTION

The present invention provides an electric field generating device, a light deflecting device, and an image display apparatus that substantially obviate one or more problems caused by the limitations and disadvantages of the related art.

According to an embodiment of the present invention, an electric field generating device includes an electric field generating unit including a substrate, line electrodes, and an electric field generating resistor and configured to generate an electric field; wherein the line electrodes are formed on at least one side of the substrate in parallel with each other so as to divide the side of the substrate into multiple sections; the electric field generating resistor is shaped like a strip and positioned so as to touch a part of each of the line electrodes; and some of the line electrodes have connectors for electric connection.

DESCRIPTION OF THE PREFERRED EMBODIMENTS

Preferred embodiments of the present invention are described below with reference to the accompanying drawings.

Figure 1A:
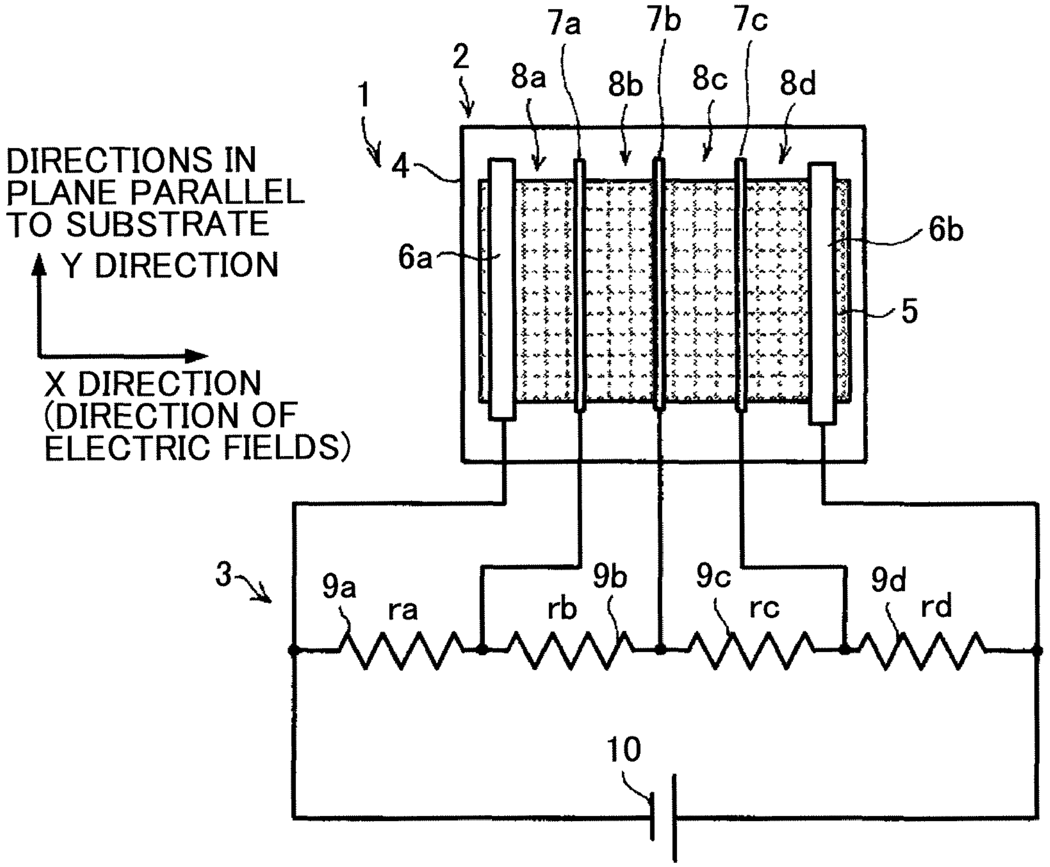
FIGS. 1A and 1B are drawings illustrating a configuration of an exemplary electric field generating device according to an embodiment of the present invention.
Figure 1B:
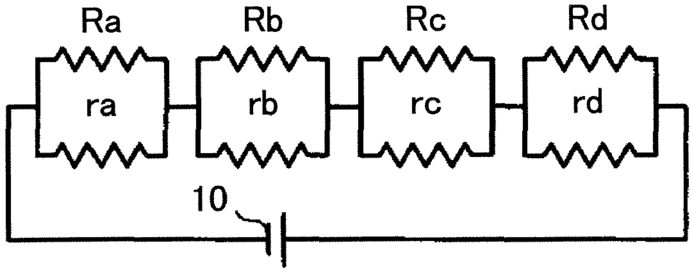

FIGS. 1A and 1B are drawings illustrating a configuration of an exemplary electric field generating device according to an embodiment of the present invention. As shown in FIGS. 1A and 1B, an electric field generating device 1 includes an electric field generating unit 2 and an adjusting resistance unit 3. The electric field generating unit 2 includes a substrate 4, an electric field generating resistor 5, parallel line electrodes 6*a* and 6*b*, and low resistance layers 7*a*, 7*b*, and 7*c*. The substrate 4 is made of, for example, a transparent material such as glass, rubber, plastic, or ceramic. The electric field generating resistor 5 is a film formed on the substrate 4, for example, a metal film, a metal oxide film, a metal nitride film, a cermet film, or a thin-film containing conductive powder or particles made of a semiconducting material such as metal or metal oxide. The line electrodes 6*a* and 6*b* are electrically connected to left and right (X direction in the figure) ends of the electric field generating resistor 5, respectively. The low resistance layers 7*a* through 7*c* are formed on the electric field generating resistor 5 between and in parallel with the line electrodes 6*a* and 6*b*. In other words, the low resistance layers 7*a* through 7*c* divide the area on the electric field generating resistor 5 between the line electrodes 6*a* and 6*b* into sections 8*a* through 8*d*. The low resistance layers 7*a* through 7*c* and the line electrodes 6*a* and 6*b* may be made of the same material and formed at the same time. Also, the electric field generating unit 2 may be configured to have line electrodes and an electric field generating resistor on each side of the substrate 4. The line electrodes 6*a* and 6*b* have connectors (not shown) for electrically connecting to the adjusting resistance unit 3. The low resistance layers 7*a* through 7*c* also have connectors for electrically connecting the low resistance layers 7*a* through 7*c* and the adjusting resistance unit 3.

In the adjusting resistance unit 3, adjusting resistors 9*a* through 9*d* corresponding to the sections 8*a* through 8*d* of the electric field generating resistor 5 are connected in series. Corresponding ends of the adjusting resistance unit 3 are connected to the line electrodes 6*a* and 6*b*. The connecting point between the adjusting resistors 9*a* and 9*b* is connected to the low resistance layer 7*a*, the connecting point between the adjusting resistors 9*b* and 9*c* is connected to the low resistance layer 7*b*, and the connecting point between the adjusting resistors 9*c* and 9*d* is connected to the low resistance layer 7*c*. In other words, the adjusting resistors 9*a* through 9*d* are connected in parallel with the sections 8*a* through 8*d* of the electric field generating resistor 5.

An exemplary mechanism of generating electric fields in the electric field generating device 1 is described below. First, electric fields along the plane of the substrate 4 are generated by using the electric field generating resistor 5 on the substrate 4.

Figure 2:
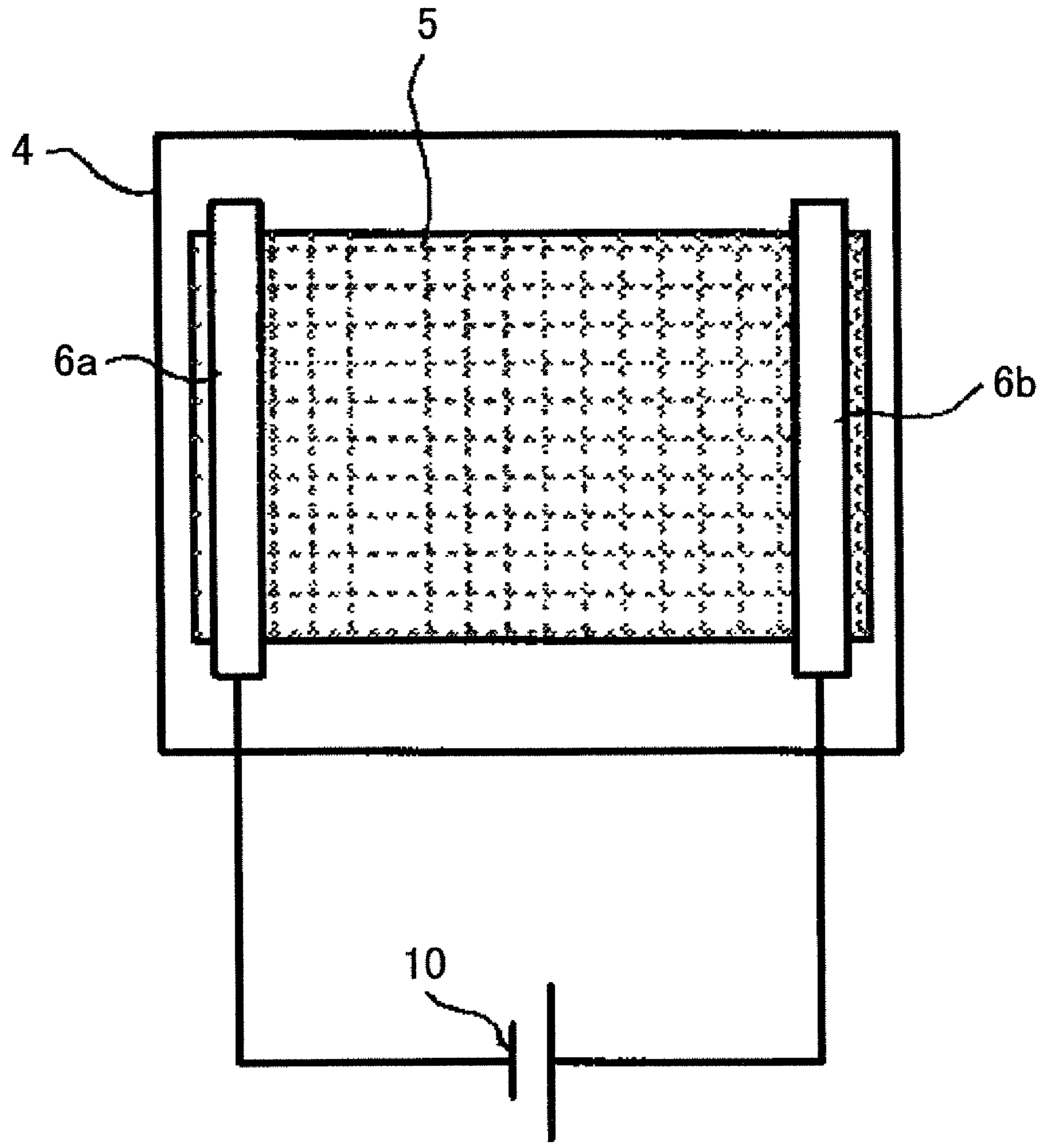
FIG. 2 is a drawing illustrating an exemplary electric field generating resistor and a pair of parallel line electrodes formed on a substrate.
Figure 3A:
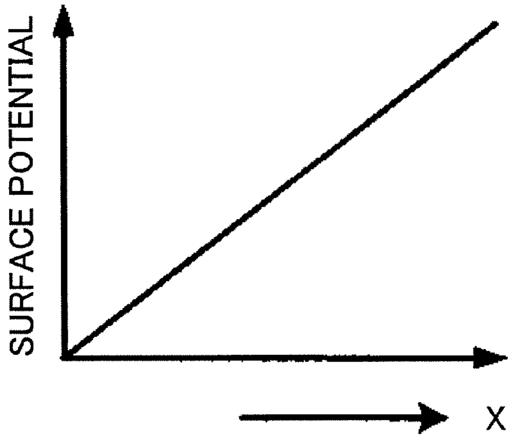
FIGS. 3A through 3C are graphs showing exemplary potential gradients of electric fields generated in the exemplary electric field generating device.

As shown in FIG. 2, a voltage is applied from a power supply 10 between the line electrodes 6*a* and 6*b* on the electric field generating resistor 5 formed on the substrate 4. Then, an electric current flows through the electric field generating resistor 5 between the line electrodes 6*a* and 6*b* and, as a result, a potential gradient as shown in FIG. 3A is formed in the inside and on the surface of the electric field generating resistor 5. In an ideal condition, the potential gradient linearly changes in the X direction that is a direction perpendicular to the parallel line electrodes 6*a* and 6*b*. As a result, horizontal electric fields in the X direction are generated near the surface of the electric field generating resistor 5 along the plane of the substrate 4. In this case, the direction of the electric fields can be reversed by changing the polarity of the voltage applied between the line electrodes 6*a* and 6*b*. The strength of the electric fields is determined by the distance between the line electrodes 6*a* and 6*b*, the applied voltage, and the resistance value of the electric field generating resistor 5.

Thus, with the electric field generating resistor 5 formed on the substrate 4, it becomes possible to generate electric fields along the plane of the substrate 4 without an external resistor and thereby to make the electric field generating device 1 smaller. Also, using the electric field generating resistor 5 makes it possible to generate electric fields having substantially the same strength and direction between the line electrodes 6*a* and 6*b*.

Meanwhile, if the resistance value of the electric field generating resistor 5 is too low, power consumption increases and the electric field generating device 1 may heat up. Also, if a material with a negative temperature coefficient of resistance is used for the electric field generating resistor 5, thermal runaway may occur in the electric field generating device 1. Therefore, to contain the increase in power consumption and heat, it is necessary to set the lower limit of the resistance value of the electric field generating resistor 5. On the other hand, if the surface resistivity of the electric field generating resistor 5 is too high, the amount of leakage current that flows through parts other than the electric field generating resistor 5 increases and, as a result, the electric field generating resistor 5 is not able to generate uniform electric fields along the plane of the substrate 4. To prevent this problem, the surface resistivity of the electric field generating resistor 5 is preferably between $10^7$ Ω/sq. and $10^{11}$ Ω/sq., and more preferably between $10^8$ Ω/sq. and $10^{10}$ Ω/sq.

Figure 3B:
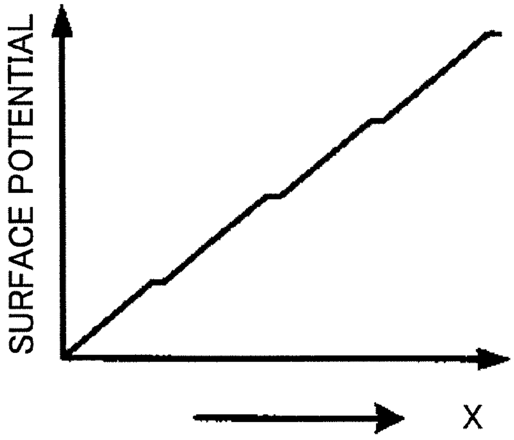

As described above, the area of the electric field generating resistor 5 of the electric field generating device 1 is divided into the sections 8*a* through 8*d*. When a voltage is applied from the power supply 10 between the line electrodes 6*a* and 6*b*, potential differences are formed in the sections 8*a* through 8 and, as a result, electric fields in the X direction are generated between the line electrodes 6*a* and 6*b* along the plane of the substrate 4. Thus, generating the electric fields in the sections 8*a* through 8*d* separated by the low resistance layers 7*a* through 7*c* makes it possible to make the electric fields between the line electrodes 6*a* and 6*b* substantially uniform in direction and strength. However, as shown in FIG. 3B, the potential gradients at the low resistance layers 7*a* through 7*c* become slightly different from those in other parts of the electric field generating resistor 5. Therefore, it is preferable to make the width of each of the low resistance layers 7*a* through 7*c* as small as possible.

Also, to generate uniform electric fields between the line electrodes 6*a* and 6*b*, it is preferable to form the electric field generating resistor 5 as uniform as possible so that the voltage drop becomes proportional to the distance in the X direction. As described above, in the electric field generating device 1, the adjusting resistors 9*a* through 9*d* are connected in parallel with the sections 8*a* through 8*d* of the electric field generating resistor 5. When the resistance value of each of the sections 8*a* through 8*d* is Ri (i=a through d) and the resistance value of each of the adjusting resistors 9*a* through 9*d* is ri, as shown by the equivalent circuit in FIG. 1B, the voltage drop in each of the sections 8*a* through 8*d* is determined by the combined resistance of the resistance value Ri and the resistance value ri. Therefore, if the resistance values of the adjusting resistors 9*a* through 9*d* are determined inappropriately, the potential gradients or the strengths of electric fields in the sections 8*a* through 8*d* become different. To prevent this problem, it is preferable to determine the resistance value ri of each of the adjusting resistors 9a through 9d so that the combined resistance of the resistance value Ri and the resistance value ri becomes proportional to the width Δxi of each of the sections 8a through 8d. Thus, it is possible to generate substantially uniform potential gradients or electric fields in the sections 8a through 8d by making the combined resistance of the resistance value Ri and the resistance value ri proportional to the width of i-th one of the sections 8a through 8d. For example, substantially uniform electric fields can be generated by making the widths Δxi of the sections 8a through 8d substantially the same and by making the resistance values of the adjusting resistors 9a through 9d substantially the same. Even if the resistance values Ri of the sections 8a through 8d do not become substantially equal because of irregularity in resistance of the electric field generating resistor 5, combined resistance values for the sections 8a through 8d can be made substantially the same by adjusting the resistance values of the adjusting resistors 9a through 9d.

Generally, resistivity of an electric field generating resistor 5 formed as a thin film may differ depending on the material and film-forming conditions. Also, the resistance value of a formed electric field generating resistor 5 may change as time passes and depending on the temperature and the environment. The adjusting resistors 9a through 9d make it possible to adjust the combined resistance values of the sections 8a through 8d and thereby make it possible to reduce the rise time of electric fields and to absorb the difference in resistivity of electric field generating resistors 5. This, in turn, makes it possible to increase the flexibility of selecting a material for the electric field generating resistor 5, to reduce the influence of inconsistent resistance values, and thereby to improve the production yield of the electric field generating device 1.

Also, connecting the adjusting resistors 9a through 9d in parallel with the sections 8a through 8d of the electric field generating resistor 5 makes it possible to reduce the time necessary for the electric fields to rise after a voltage is applied to the electric field generating device 1 or after the polarity of the voltage is changed. When the line electrodes 6a and 6b are connected to the electric field generating resistor 5, capacitance components are formed at grain boundaries of the crystal grains constituting the electric field generating resistor 5. The rise time of electric fields increases because of the capacitance components and the resistance of the sections 8a through 8d. The rise time can be reduced by connecting the adjusting resistors 9a through 9d in parallel with the sections 8a through 8d and thereby reducing the combined resistance values of the sections 8a through 8d. Also, the rise time of the electric fields can be further reduced by increasing the number of sections into which the electric field generating resistor 5 is divided and by decreasing the resistance value of each adjusting resistor. However, if the resistance values of adjusting resistors are too low, the amount of electric power consumed by the adjusting resistors increases. Therefore, the resistance values of adjusting resistors are preferably determined taking into account the amount of heat to be generated and the rated power of the adjusting resistors.

In the electric field generating device 1 described above, the electric field generating resistor 5 is formed on the entire area of a surface of the substrate 4. However, the electric field generating resistor 5 may be formed on a part of the surface of the substrate 4.

Figure 4:
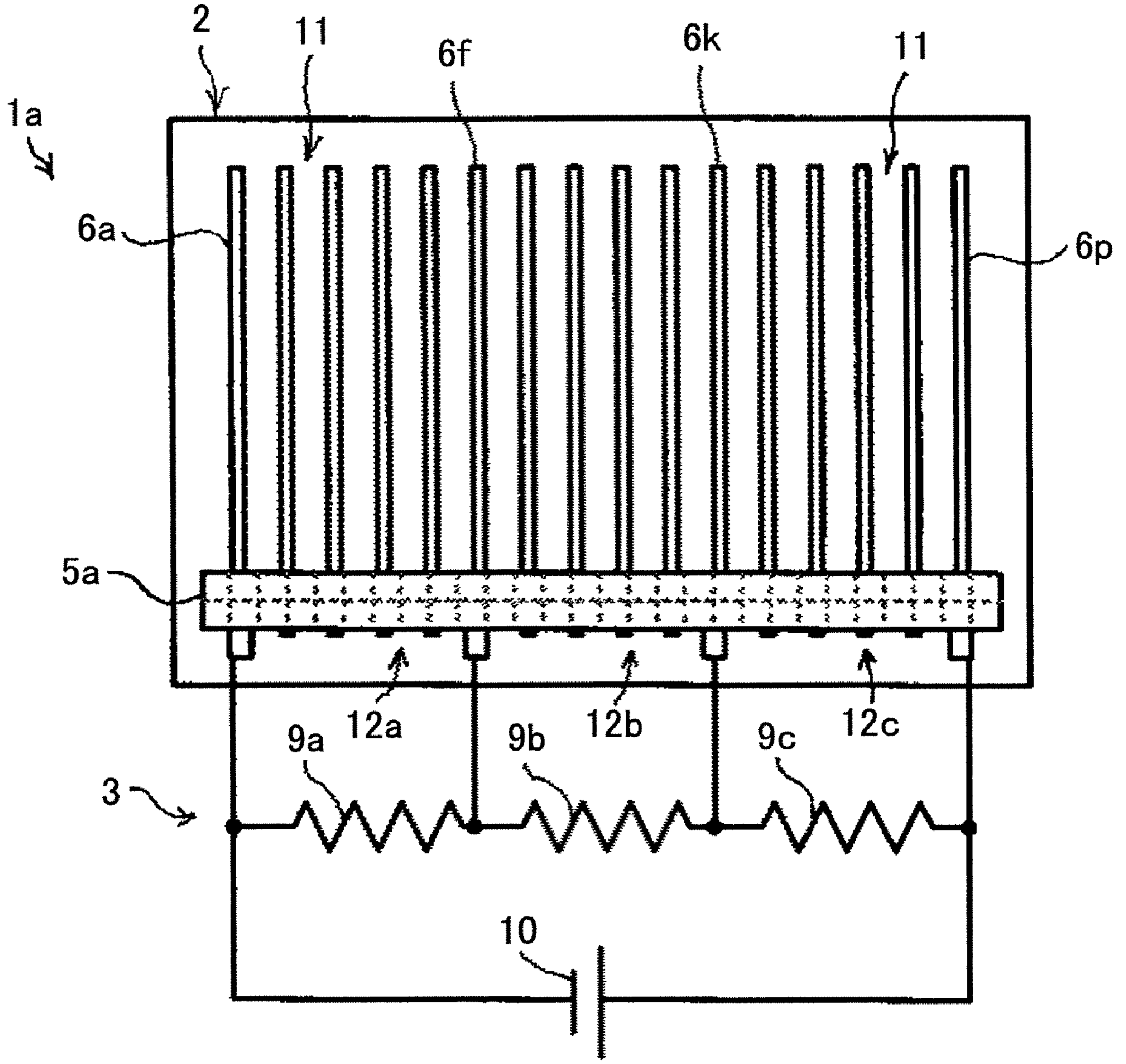
FIG. 4 is a drawing illustrating an exemplary configuration of another exemplary electric field generating device according to an embodiment of the present invention.

FIG. 4 is a drawing illustrating an exemplary configuration of an electric field generating device 1a with an electric field generating resistor 5a formed on a part of the substrate 2. The electric field generating unit 2 of the electric field generating device 1a includes, for example, 16 parallel line electrodes 6a through 6p formed on the substrate 4. The line electrodes 6a through 6p divide the area on the substrate 4 into multiple sections 11. An electric field generating resistor 5a is shaped like a strip and formed along the edges of the line electrodes 6a through 6p. The line electrodes 6a through 6p are connected in series by the electric field generating resistor 5a. In other words, the electric field generating resistor 5a is stacked on the edges of the line electrodes 6a through 6p. This configuration is to eliminate optical influence on the electric field generating resistor 5a. The electric field generating resistor 5a may also be formed as an integral part of the line electrodes 6a through 6p. The adjusting resistance unit 3 includes adjusting resistors 9a through 9c. Corresponding ends of the adjusting resistance unit 3 are connected to the leftmost line electrode 6a and the rightmost line electrode 6p. The connecting point between the adjusting resistors 9a and 9b and the connecting point between the adjusting resistors 9b and 9c are connected to the line electrodes 6f and 6k, respectively. The line electrodes 6f and 6k divide the sections 11 into adjusting sections 12a through 12c each including five sections 11. The adjusting resistors 9a through 9c are connected in parallel with the adjusting sections 12a through 12c of the electric field generating resistor 5a. Among the line electrodes 6a through 6p, the line electrodes 6a, 6f, 6k, and 6p have connectors (not shown) for electrically connecting to the adjusting resistors 9a through 9c.

Figure 3C:
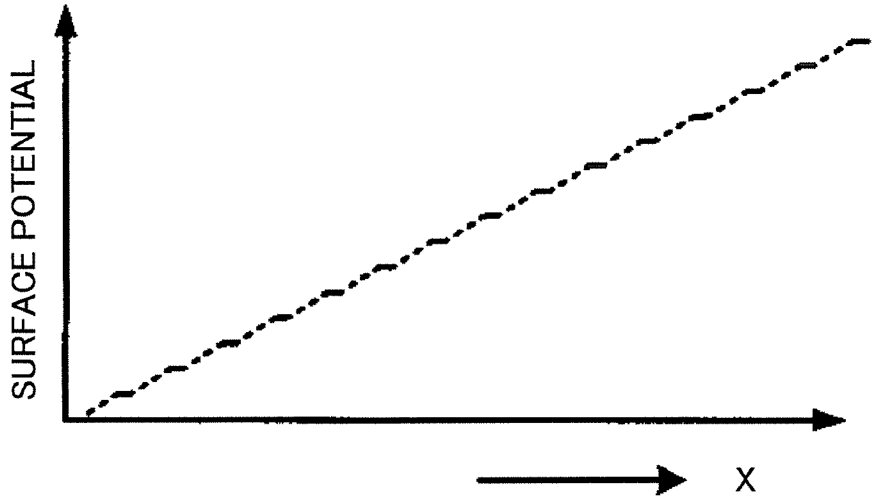

When a voltage is applied from the power supply 10 between the line electrodes 6a and 6p at leftmost and rightmost ends of the electric field generating device 1a, an electric current flows through the electric field generating resistor 5a. As the electric current flows through the electric field generating resistor 5a, the voltage becomes lower. As a result, potential gradients are generated between the line electrodes 6a through 6p as shown in FIG. 3C. In other words, an electric potential distribution perpendicular to the line electrodes 6a through 6p is formed. It is assumed that the potential gradients become substantially uniform when the pitch between the line electrodes 6a through 6p or the width of each of the sections 11 is large enough with respect to the width of each of the line electrodes 6a through 6p. The potential gradients generate horizontal electric fields near the surface of the substrate 4 along its plane. Thus, in this embodiment, different electric potentials are given to the line electrodes 6a through 6p by using the voltage drop caused when an electric current is passed through the strip-shaped electric field generating resistor 5a, and the resulting discrete changes in electric potential generate horizontal electric fields along the plane of the substrate 4. This method makes it possible to generate substantially uniform electric fields even on a large area. Also, this method makes it possible to form electric fields in an area that is away from resistors that generate heat and thereby to reduce the influence of heat on other parts. Therefore, this method is useful for a device in which a part made of a material susceptible to heat, such as liquid crystal, is driven by electric fields.

Also, as in the case of the electric field generating device 1, connecting the adjusting resistors 9a through 9c in parallel with the adjusting sections 12a through 12c of the electric field generating resistor 5a makes it possible to reduce the time necessary for the electric fields to rise after a voltage is applied to the electric field generating device 1a or after the polarity of the voltage is changed.

An exemplary light deflecting device using the electric field generating device 1 or 1a is described below.

Figure 5A:
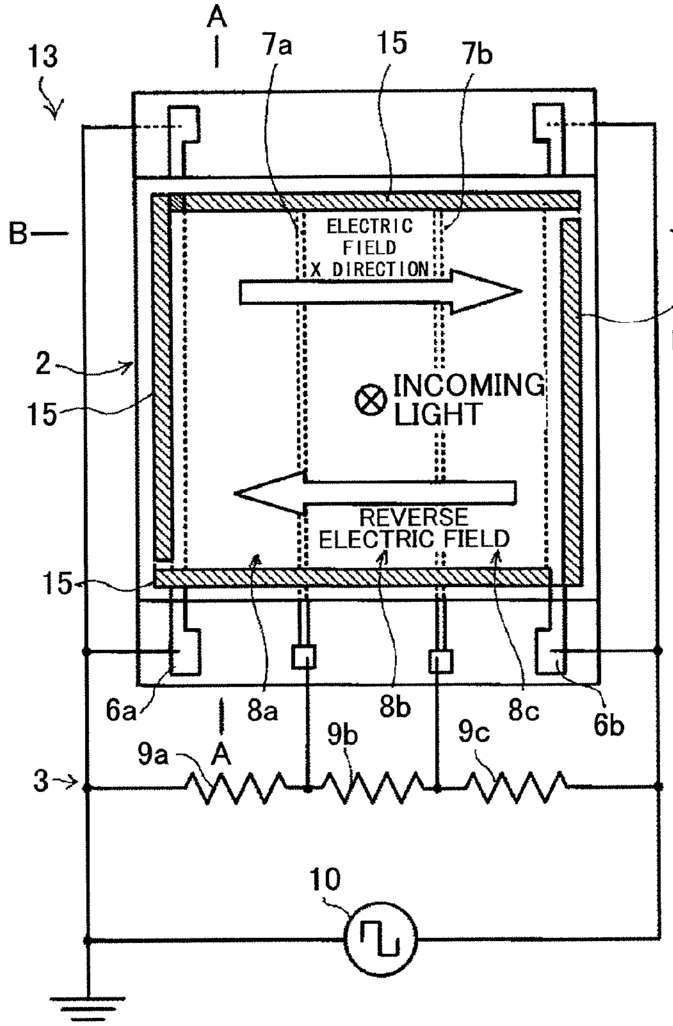
FIGS. 5A through 5C are drawings illustrating an exemplary configuration of a first light deflecting device.
Figure 5B:
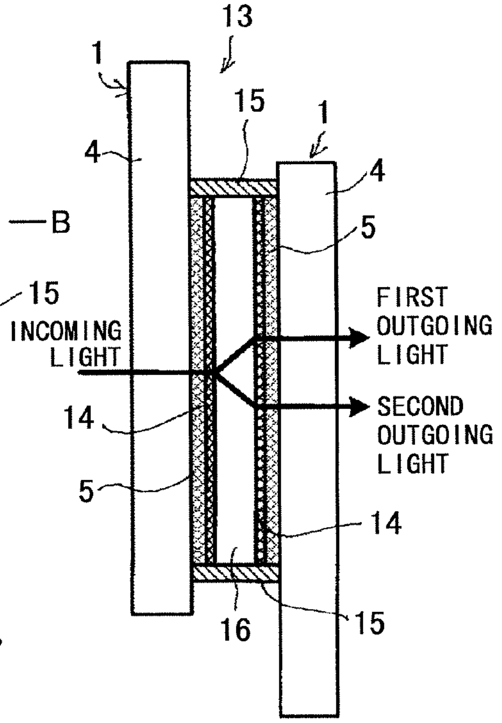
Figure 5C:
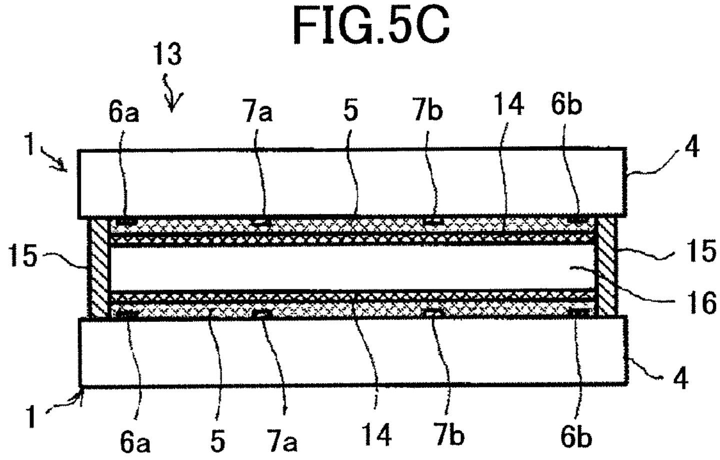

FIGS. 5A through 5C are drawings illustrating an exemplary configuration of a light deflecting device 13 using the electric field generating device 1. FIG. 5A is an elevational view, FIG. 5B is a cross-sectional view taken along line A-A, and FIG. 5C is a cross-sectional view taken along line B-B of the light deflective device 13. The light deflecting device 13 includes two sets of the electric field generating device 1 and an alignment film 14, four spacers 15, and a liquid crystal layer 16. Each of the electric field generating devices 1 in the light deflecting device 13 includes low resistance layers 7*a* and 7*b* that divide the area between the line electrodes 6*a* and 6*b* on the transparent electric field generating resistor 5 into three sections. The low resistance layers 7*a* and 7*b* are placed in an area where light passes through and therefore preferably made of a material with high transmittance. The number and positions of the low resistance layers 7 are not limited to those mentioned above. Each of the spacers 15 is made of a film with a thickness of several μm to 100 μm or a spheroid with a diameter of several μm to 100 μm. The line electrodes 6*a* and 6*b* and the low resistance layers 7*a* and 7*b*, as shown in FIG. 5, have connectors for electrically connecting to the adjusting resistance unit 3. Those connectors make it easier to connect the line electrodes 6*a* and 6*b* and the low resistance layers 7*a* and 7*b* to the adjusting resistance unit 3.

The alignment film 14 is formed on one side of the substrate 4 of each of the electric field generating devices 1 together with the transparent electric field generating resistor 5, the line electrodes 6*a* and 6*b*, and the low resistance layers 7*a* and 7*b*. The substrates 4 of the two electric field generating devices 1 are joined by the spacers 15 so that the electric field generating devices 1 face each other at a certain distance with the alignment layers 14 facing inward. The space between the alignment films 14 is filled with the liquid crystal layer 16 that can form a chiral smectic C phase. The alignment film 14 is a vertical alignment film that aligns liquid crystal molecules in a vertical direction with respect to the alignment film 14 itself so that the layer normal direction of the layer structure of the liquid crystal molecules that form a chiral smectic C phase becomes substantially vertical with respect to the surface of the substrate 4. For the alignment film 14, a silane coupling agent or a commercially-available liquid crystal vertical alignment agent may be used.

The liquid crystal layer 16 is described below in detail. A smectic liquid crystal is a liquid crystal layer in which liquid crystal molecules are arranged in layers with the long axes of the liquid crystal molecules aligned. When the normal direction of the layers (layer normal direction) and the long axis direction of the liquid crystal molecules are the same, the smectic liquid crystal is called a smectic A phase. When the layer normal direction and the long axis direction of the liquid crystal molecules are different, the smectic liquid crystal is called a smectic C phase. Generally, a ferroelectric liquid crystal made of a smectic C phase has a spiral structure where the liquid crystal director in each layer rotates spirally when no external electric field is applied and is called a chiral smectic C phase. On the other hand, liquid crystal directors in the layers in an anti-ferroelectric liquid crystal made of a chiral smectic C phase face opposite directions. A liquid crystal made of a chiral smectic C phase as described above has an asymmetric carbon in its molecular structure and is therefore spontaneously polarized. In such a liquid crystal made of a chiral smectic C phase, the liquid crystal molecules are rearranged in a direction determined by the spontaneous polarization Ps and the external electric field E, and the optical property of the liquid crystal is thereby controlled.

In the descriptions below, it is assumed that a ferroelectric liquid crystal is used as the liquid crystal layer 16 of the light deflecting device 13. However, an anti-ferroelectric liquid crystal may also be used as the liquid crystal layer 16. The molecular structure of a ferroelectric liquid crystal made of a chiral smectic C phase includes a main chain, a spacer, a backbone, a bonding part, and a chiral part. As the main chain, for example, polyacrylate, polymethacrylate, polysiloxane, or polyoxyethylene may be used. The spacer is used to bond the backbone, the bonding part, and the chiral part that are associated with molecular rotation to the main chain. As the spacer, for example, a methylene chain with a certain length may be used. The bonding part bonds the chiral part and the backbone having a rigid structure such as a biphenyl structure. As the bonding part, for example, (—COO—) may be used. The rotation axis of spiral molecular rotation in the liquid crystal layer 16 made of a chiral smectic C phase is oriented in a direction perpendicular to the surface of the substrate 4 by the alignment film 14. In other words, the liquid crystal layer 16 is homeotropically aligned.

When a voltage is applied between the line electrodes 6*a* and 6*b* of each of the two opposing electric field generating devices 1 in the light deflecting device 13, an electric current flows in each of the electric field generating resistors 5 and, as a result, a potential gradient is formed in the inside and on the surface of each of the electric field generating resistors 5. The potential gradient is distributed linearly in the X direction shown in FIG. 5A and therefore generates uniform electric fields in the X direction that is the plane direction in the inside of the liquid crystal layer 16. In other words, horizontal electric fields that are parallel to the alignment film 14 are generated. In this case, the direction of the horizontal electric fields inside of the liquid crystal layer 16 can be changed by changing the polarity of the voltage applied between the line electrodes 6*a* and 6*b*. When the direction of the horizontal electric fields is changed, the tilt direction of the average optical axis of the liquid crystal layer 16 changes. As a result, incoming light linearly polarized in a direction parallel to the line electrodes 6*a* and 6*b* is deflected by an optical path shift that varies depending on the thickness of the liquid crystal layer 16 and the ordinary/extraordinary refractive index of the liquid crystal molecules. When the polarity of the voltage applied between the line electrodes 6*a* and 6*b* is changed, the deflection angle of the light is changed and either a first outgoing light or a second outgoing light is output as shown in FIG. 5B.

The voltage to be applied between the line electrodes 6*a* and 6*b*, i.e. the voltage necessary to deflect the incoming light by the light deflecting device 13 to change its optical path is determined by the electric field strength necessary, the distance between the line electrodes 6*a* and 6*b*, and the resistance value of the electric field generating resistor 5. The resistance value of the electric field generating resistor 5 must be within a certain range for the light deflecting device 13 to function correctly. The electric field generating resistor 5 is formed in an area where light passes through and therefore must be made of a material that transmits light. For example, the electric field generating resistor 5 may be formed as a thin-film resistor made of a transparent oxide semiconductor or a transparent nitride semiconductor. The resistance value of such a thin-film resistor varies greatly depending on the deposition conditions. Therefore, the deposition conditions in forming the thin-film resistor must be determined so that a desired resistance value is obtained. However, even when the same deposition conditions are used, the resistivity of thin-film resistors may still vary. Also, the resistance value of a thin-film resistor may change as time passes and depending on the environment. Therefore, it is necessary to prevent the influence of change in resistance value of the electric field generating resistor 5 and thereby to ensure that the light deflecting device 13 functions correctly.

In this embodiment, the area on the electric field generating resistor 5 is divided into three sections 8*a* through 8*c* by the low resistance layers 7$a$ and 7$b$, and the adjusting resistors 9$a$ through 9$c$ of the adjusting resistance unit 3 are connected in parallel with the sections 8$a$ through 8$c$. This configuration makes it possible to reduce the delay in response time of the electric fields when deflecting light with the light deflecting device 13 and to increase the resistance value of the electric field generating resistor 5. This, in turn, increases the flexibility of selecting a material for the electric field generating resistor 5 and makes it possible to produce a light deflecting device 13 that is less influenced by the change of resistance value and works stably.

Figure 6A:
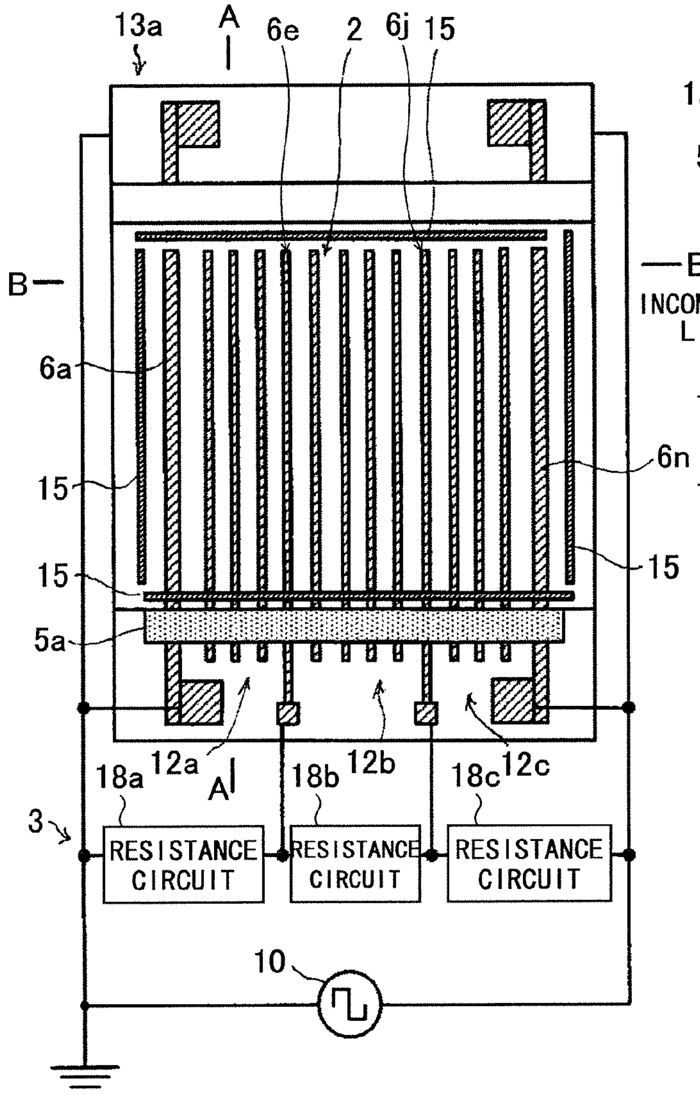
FIGS. 6A through 6C are drawings illustrating an exemplary configuration of a second light deflecting device.
Figure 6B:
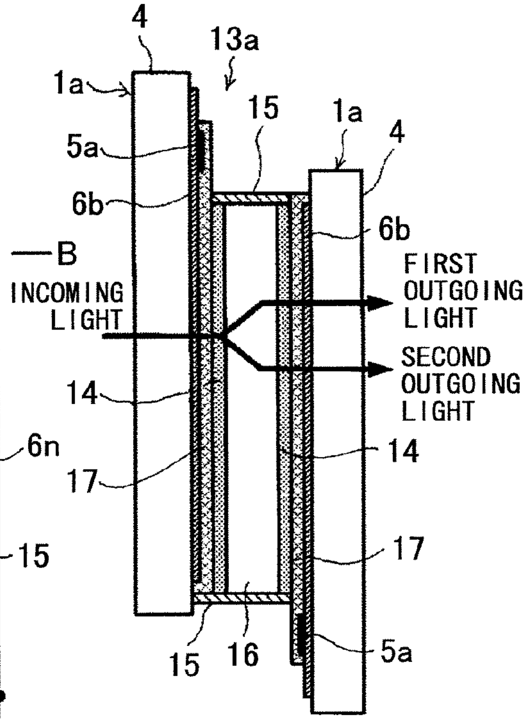
Figure 6C:
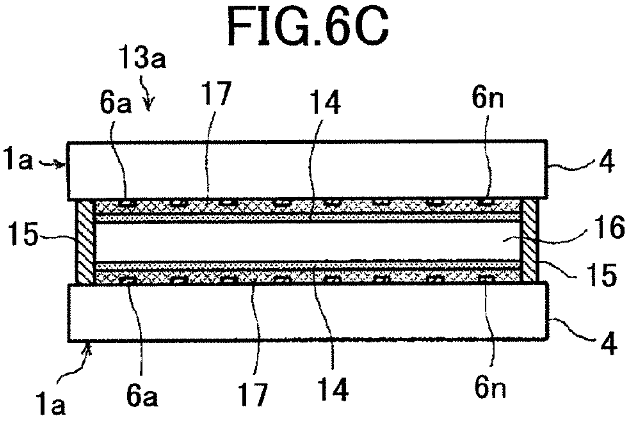

FIGS. 6A through 6C are drawings illustrating an exemplary configuration of a light deflecting device 13$a$ including the electric field generating device 1$a$. FIG. 6A is an elevational view, FIG. 6B is a cross-sectional view taken along line A-A, and FIG. 6C is a cross-sectional view taken along line B-B of the light deflecting device 13$a$. The light deflecting device 13$a$ includes two sets of the electric field generating device 1$a$, a dielectric layer 17, and the alignment layer 14, four spacers 15, and the liquid crystal layer 16. The electric field generating unit 2 of each of the electric field generating devices 1$a$ in the light deflecting device 13$a$ includes transparent line electrodes 6$a$ through 6$n$ formed on the substrate 4 and the electric field generating resistor 5$a$ that is shaped like a strip and formed along the edges of the line electrodes 6$a$ through 6$n$. In other words, the electric field generating resistor 5$a$ is stacked on the edges of the line electrodes 6$a$ through 6$n$. This configuration is to reduce optical influence on the electric field generating resistor 5$a$. However, the position of the electric field generating resistor 5$a$ is not limited to the edges of the line electrodes 6$a$ through 6$n$. The electric field generating resistor 5$a$ may be formed in any position in a shape of a strip as long as it is in contact with parts of the line electrodes 6$a$ through 6$n$. The dielectric layer 17 is formed on one side of the substrate 4 of each of the electric field generating devices 1$a$ together with the transparent electric field generating resistor 5$a$ and the line electrodes 6$a$ through 6$n$. The alignment layer 14 is formed on the far side of the dielectric layer 17 from the substrate 4. The dielectric layers 17 of the two electric field generating devices 1$a$ are joined by the spacers 15 so that the two electric field generating devices 1$a$ face each other at a certain distance with the alignment layers 14 facing inward. The space between the alignment layers 14 is filled with the liquid crystal layer 16 that can form a chiral smectic C phase. Using a liquid crystal that can form a chiral smectic C phase as the liquid crystal layer 16 makes it possible to provide a stable light deflecting device 13$a$ that responds quickly. When the electric field generating resistor 5$a$ is made of a material with high transmittance, the electric field generating resistor 5$a$ may be formed in a part of the effective area of the light deflecting device 13$a$ surrounded by the spacers 15. However, when the material has low transmittance, it is preferable to form the electric field generating resistor 5$a$ outside of the effective area of the light deflecting device 13$a$.

Figure 7:
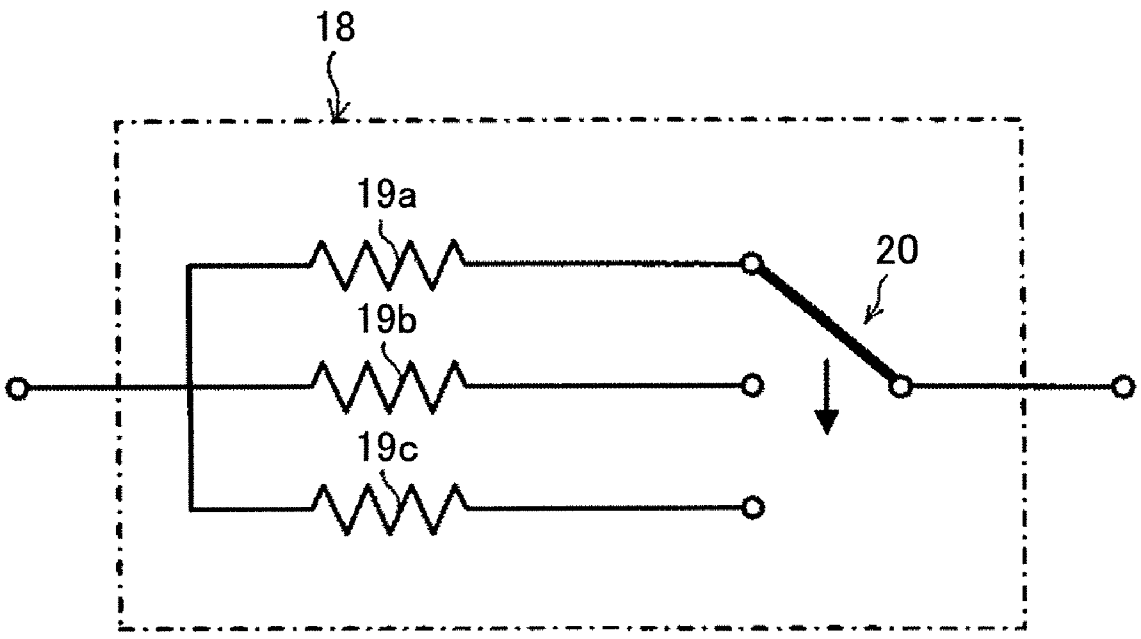
FIG. 7 is a circuit diagram illustrating an exemplary configuration of a resistance circuit in an adjusting resistance unit of the exemplary electric field generating device.

The adjusting resistance unit 3 of the electric field generating device 1$a$ includes resistance circuits 18$a$ through 18$c$ that are connected in parallel with adjusting sections 12$a$ through 12$c$, respectively, of the strip-shaped electric field generating resistor 5$a$. The line electrodes 6$e$ and 6$j$ that divide the electric field generating resistor 5$a$ into the adjusting sections 12$a$ through 12$c$ have connectors for electrically connecting to the resistance circuits 18$a$ through 18$c$. As shown in FIG. 7, each of the resistance circuits 18$a$ through 18$c$ includes resistors 19$a$ through 19$c$ connected in parallel and a switch 20 for switching the connection of the resistors 19$a$ through 19$c$. The switch 20 makes it possible to change the resistance value of each of the resistance circuits 18$a$ through 18$c$ that are connected in parallel with the adjusting sections 12$a$ through 12$c$. Even if the resistance values in the electric field generating resistor 5$a$ are not uniform, the switch 20 makes it possible to make the combined resistance values and potential gradients in the adjusting sections 12$a$ through 12$c$ substantially uniform and thereby to generate substantially uniform electric fields.

The line electrodes 6$e$ and 6$j$ to be connected to the adjusting resistor 3 are preferably made longer than other line electrodes to make the connection easier.

The line electrodes for dividing the electric field generating resistor 5$a$ or to be connected to the adjusting resistor 3 can be selected freely. However, it is preferable to provide more than one line electrode between the line electrodes to be connected to the adjusting resistor 3. As described above, the potential gradients in the adjusting sections 12 can be made substantially uniform by connecting some of the line electrodes to the adjusting resistance unit 3.

When a voltage is applied from the power supply 10 between the line electrodes 6$a$ and 6$n$ at leftmost and rightmost ends of each of the electric field generating devices 1$a$, an electric current flows through the electric field generating resistor 5. As the electric current flows through the electric field generating resistor 5, the voltage becomes lower. As a result, potential gradients are generated between the line electrodes 6$a$ through 6$n$. The potential gradients generate horizontal electric fields inside of the crystal layer 16 which horizontal electric fields are substantially parallel to the alignment film 14. When the polarity of the voltage applied between the line electrodes 6$a$ and 6$b$ is changed, the potential gradients between the line electrodes 6$a$ through 6$n$ are inverted and the direction of the horizontal electric fields inside of the liquid crystal layer 16 is changed. As a result, light entering the light deflecting device 13$a$ at a right angle is deflected. The dielectric layer 17 formed between the line electrodes 6$a$ through 6$n$ and the liquid crystal layer 16 in the electric field generating device 1$a$ reduces vertical electric field components generated near the line electrodes 6$a$ through 6$n$ and thereby makes it possible to form a substantially uniform electric field distribution inside of the liquid crystal layer 16.

In this embodiment, as described above, the area on the electric field generating resistor 5$a$ of the electric field generating device 1$a$ is divided into three adjusting sections 12$a$ through 12$c$ and the resistance circuits 18$a$ through 18$c$ are connected in parallel with the adjusting sections 12$a$ through 12$c$. This configuration makes it possible to reduce the delay in response time of the electric fields when deflecting light with the light deflecting device 13$a$ and to increase the resistance value of the electric field generating resistor 5$a$. This, in turn, increases the flexibility of selecting a material for the electric field generating resistor 5$a$ and makes it possible to produce a light deflecting device 13$a$ that is less influenced by the change of resistance value and works stably. Also, the resistance value of each of the resistance circuits 18$a$ through 18$c$ can be changed by switching the resistors 19$a$ through 19$c$ using the switch 20. With this configuration, even if the resistance value of the electric field generating resistor 5$a$ is inconsistent because of the production process, the combined resistance values of the adjusting sections 12$a$ through 12$c$ can be adjusted by changing the resistance values of the resistance circuits 18$a$ through 18$c$ to stably deflect light.

In the light deflecting device 13$a$ shown in FIGS. 6A through 6C, the adjusting resistance unit 3 is provided in one of the two electric field generating devices 1$a$. However, the adjusting resistance unit 3 may be provided for each of the two electric field generating devices 1*a*. Such a configuration further improves the capability to make electric fields uniform. In this case, the line electrodes 6*e* and 6*j* that divide the electric field generating resistor 5*a* into the adjusting sections 12*a* through 12*c* in each of the two electric field generating devices 1*a* are connected to the corresponding adjusting resistance unit 3. The number and arrangement of the adjusting sections in each of the electric field generating devices 1*a* may be determined independently. Also, the line electrodes to be connected to the adjusting resistance units 3 of the two electric field generating devices 1*a* may be or may not be in corresponding positions across the liquid crystal layer 16.

When the line electrodes to be connected to the adjusting resistance units 3 of the two electric field generating devices 1*a* are in corresponding positions, the line electrodes may be connected to the same adjusting resistors 9*a* through 9*c* or the same resistance circuits 18*a* through 18*c*. In other words, it is possible to use one adjusting resistance unit 3 for the two electric field generating devices 1*a*. In this case, since only one adjusting resistance unit 3 is necessary, the configuration of the light deflecting device 13*a* can be simplified. Also, in this configuration, the line electrodes 6*a* through 6*n* of one electric field generating device 1*a* and those of the other electric field generating device 1*a* are electrically connected and the electric potentials of the line electrodes 6*a* through 6*n* in both of the electric field generating devices 1*a* become substantially the same. Therefore, the above configuration also makes it possible to suppress the generation of vertical electric fields and thereby to efficiently generate substantially uniform electric fields.

Figure 8:
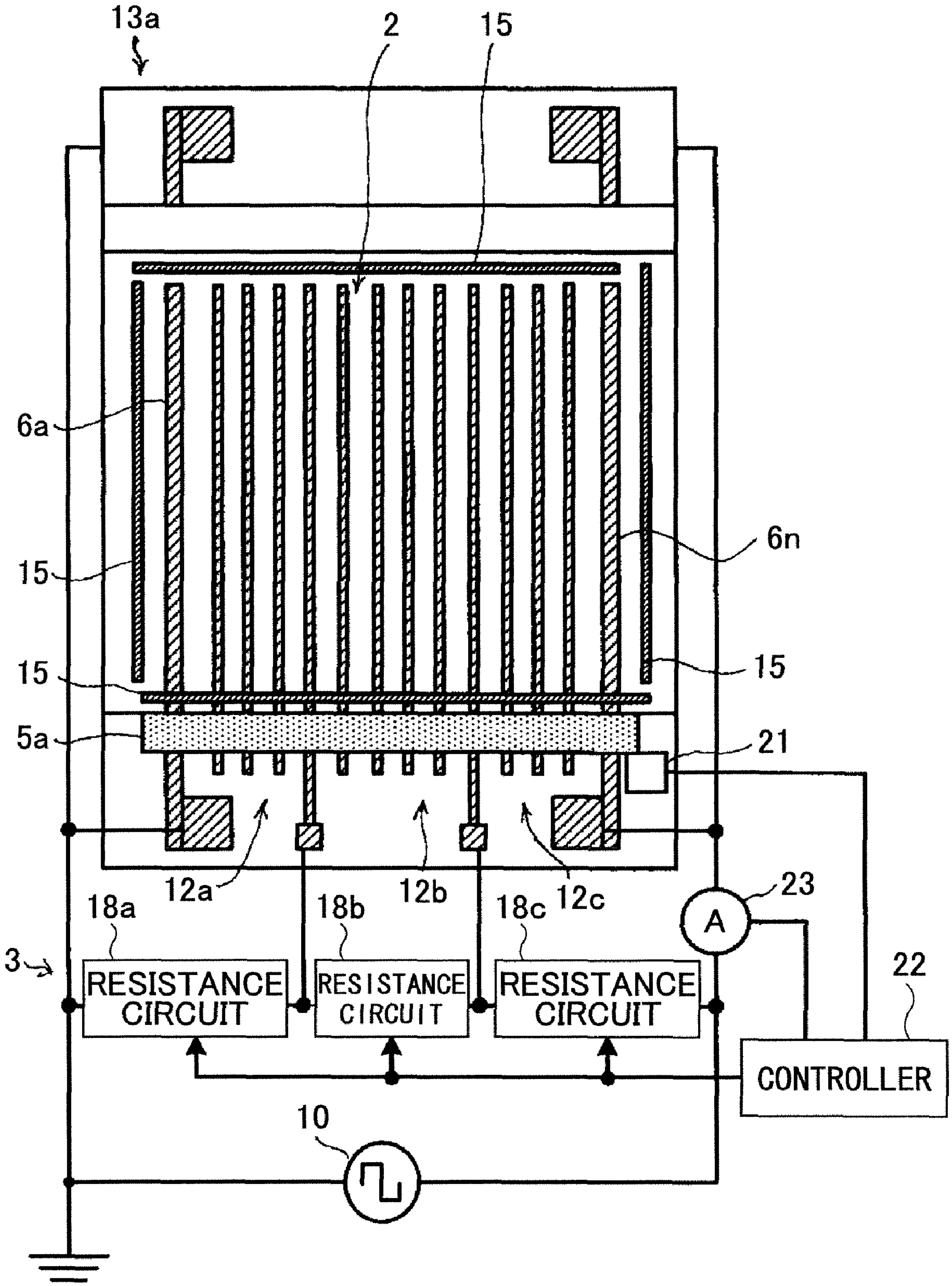
FIG. 8 is a drawing illustrating an exemplary configuration of a third light deflecting device.

The light deflecting device 13*a* shown in FIG. 8 includes a temperature sensor 21, such as a thermocouple or a thermistor, positioned close to the electric field generating resistor 5*a* on the substrate 4 of the electric field generating device 1*a* of the light deflecting device 13*a*. In the light deflecting device 13*a*, a controller 22 detects a temperature near the electric field generating resistor 5*a* based on an output from the temperature sensor 21, controls the switch 20 of each of the resistance circuits 18*a* through 18*c* according to the detected temperature, and thereby changes the resistance value of each of the resistance circuits 18*a* through 18*c*. This configuration makes it possible to cope with the change in resistance value of the electric field generating resistor 5*a* which change is caused by the temperature change of the electric field generating resistor 5*a* during the operation of the light deflecting device 13*a*. Also, the light deflecting device 13*a* may be configured to include a current detecting unit 23 for detecting an electric current flowing through the electric field generating resistor 5*a*. In this case, the resistance value of each of the resistance circuits 18*a* through 18*c* can also be adjusted based on the electric current value detected by the current detecting unit 23. This configuration makes it possible to cope with the change in resistance value of the electric field generating resistor 5*a* which change is caused by a factor other than the temperature change and thereby to stably deflect light. As described above, the light deflecting device 13*a* may be configured to change the resistance value of each of the resistance circuits 18*a* through 18*c* according to a detected temperature or electric current. The light deflecting device 13*a* having such a configuration is able to form stable electric fields having high response speed without being affected by the changes in temperature, electric current, and surrounding environment.

In the above embodiment, the resistors 19*a* through 19*c* and the switch 20 are provided in each of the resistance circuits 18*a* through 18*c*. However, each of the resistance circuits 18*a* through 18*c* may be implemented by a variable resistor. As described above, in the light deflecting device 13*a* shown in FIGS. 6A through 6C, the adjusting resistance unit 3 is provided in one of the two electric field generating devices 1*a*. However, the adjusting resistance unit 3 may be provided for each of the two electric field generating devices 1*a*. Such a configuration further improves the capability to make electric fields uniform. In this case, the line electrodes dividing the electric field generating resistor 5*a* into adjusting sections in each of the two electric field generating devices 1*a* are connected to the corresponding adjusting resistance unit 3. The number and arrangement of the adjusting sections in each of the electric field generating devices 1*a* may be determined independently. Also, the line electrodes to be connected to the adjusting resistance units 3 of the two electric field generating devices 1*a* may be or may not be in corresponding positions across the liquid crystal layer 16.

When the line electrodes to be connected to the adjusting resistance units 3 of the two electric field generating devices 1*a* are in corresponding positions, the line electrodes may be connected to the same adjusting resistors 9*a* through 9*c* or the same resistance circuits 18*a* through 18*c*. In other words, it is possible to use one adjusting resistance unit 3 for the two electric field generating devices 1*a*. In this case, since only one adjusting resistance unit 3 is necessary, the configuration of the light deflecting device 13*a* can be simplified.

Also, in this configuration, the line electrodes 6*a* through 6*n* of one electric field generating device 1*a* and those of the other electric field generating device 1*a* are electrically connected and the electric potentials of the line electrodes 6*a* through 6*n* in both of the electric field generating devices 1*a* become substantially the same. Therefore, the above configuration also makes it possible to suppress the generation of vertical electric fields and thereby to efficiently generate substantially uniform electric fields.

Figure 9A:
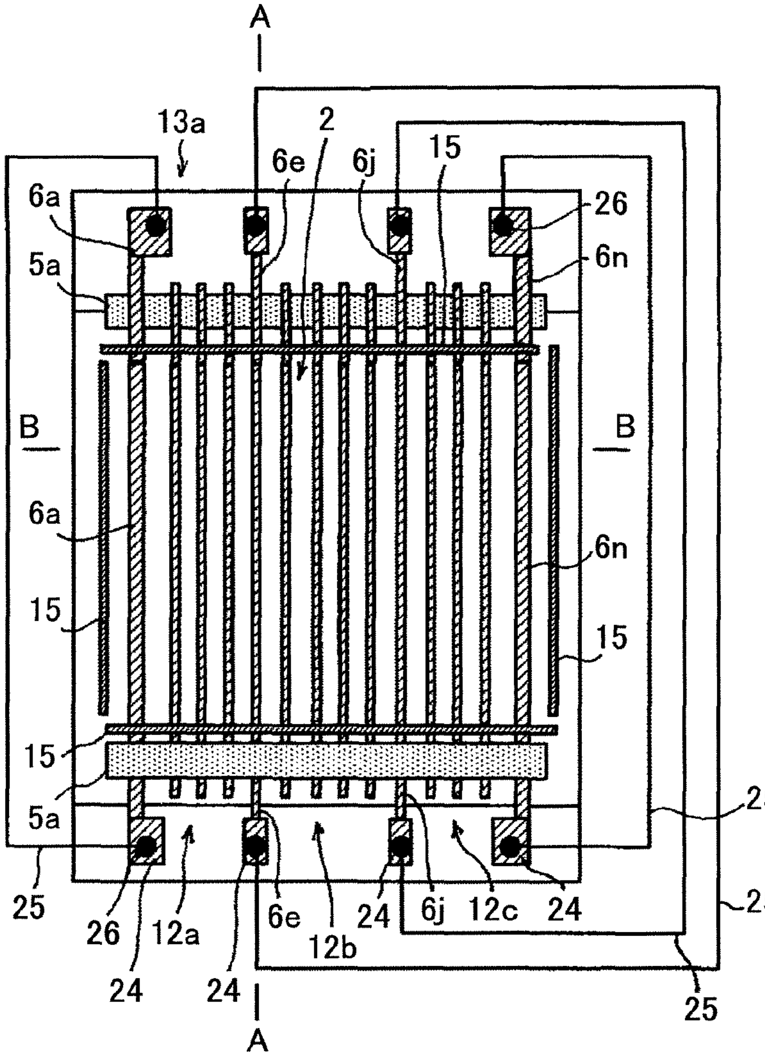
FIGS. 9A through 9C are drawings illustrating an exemplary configuration of a fourth light deflecting device.
Figure 9B:
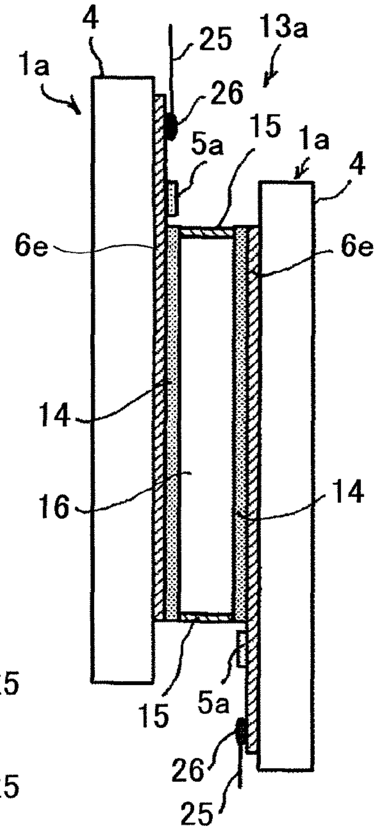
Figure 9C:
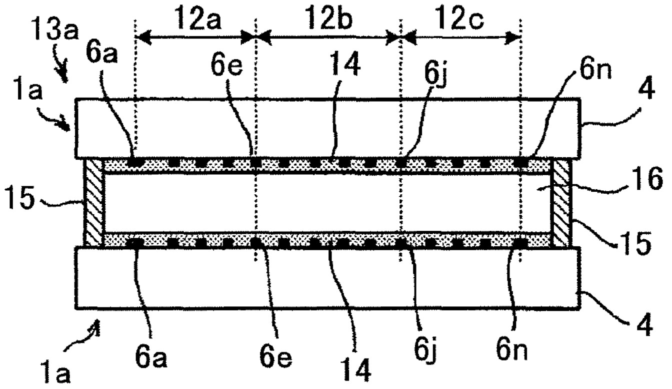

In the light deflecting device 13*a* shown in FIGS. 9A through 9C, each of the two electric field generating devices 1*a* includes the line electrodes 6*a* through 6*n* and the strip-shaped electric field generating resistor 5*a* that is divided into the adjusting sections 12*a* through 12*c* by the line electrodes 6*e* and 6*j*. Each of the line electrodes 6*a*, 6*e*, 6*j*, and 6*n*, which form the left and right sides of the adjusting sections 12*a* through 12*c*, has a connector 24 on one end. In this configuration, it is preferable to electrically connect the line electrodes 6*a*, 6*e*, 6*j*, and 6*n* of one of the two electric field generating devices 1*a* and the corresponding line electrodes 6*a*, 6*e*, 6*j*, and 6*n* of the other one of the two electric field generating devices 1*a* by leads 25 and solder balls 26. When the corresponding line electrodes 6*a*, 6*e*, 6*j*, and 6*n* of the two electric field generating devices 1*a* are electrically connected to each other, the electric potentials of each pair of the line electrodes 6*a*, 6*e*, 6*j*, and 6*n*, which form the left and right sides of the adjusting sections 12*a* through 12*c*, become substantially the same. In this case, the difference between the electric potentials of each pair of the line electrodes other than the line electrodes 6*a*, 6*e*, 6*j*, and 6*n* is also reduced. In this embodiment, as described above, some of the line electrodes 6*a* through 6*n* in one of the two electric field generating devices 1*a* are connected to the corresponding ones of the line electrodes 6*a* through 6*n* in the other one of the two electric field generating devices 1*a*. This configuration reduces the potential difference between the two electric field generating devices 1*a* and thereby makes it possible to suppress diffraction. In this configuration, line electrodes without the connectors 24 are preferably provided between line electrodes with the connectors 24 to form adjusting sections with an appropriate width.

In the above embodiment, the corresponding line electrodes 6a, 6e, 6j, and 6n of the two electric field generating devices 1a are electrically connected to each other to make the electric potentials of each pair of the line electrodes 6a, 6e, 6j, and 6n substantially the same and thereby to prevent the light passing through an operating light deflecting device 13a from being diffracted. According to an experiment, when the light deflecting device 13a, which includes two electric field generating devices 1a each having the line electrodes 6a through 6n, is in operation, it is possible that light passing through the light deflecting device 13a is diffracted. This diffraction may reduce the resolution performance of the light deflecting device 13a and may result in the generation of a ghost image. Such diffraction is caused by a diffraction grating formed by the movement of electric fields and liquid crystal. The pitch of the diffraction grating matches the pitch of the line electrodes 6a through 6n. In the light deflecting device 13a, the strengths and directions of electric fields differ in the parts where the line electrodes 6a through 6n are formed and in the parts where they are not formed. It is assumed that the refractive indices of the liquid crystal are modulated at the above pitch because of the different strengths and directions of the electric fields and, as a result, a diffraction grating is formed. Also, it was found that the diffraction effects become greater as the potential difference between the substrates 4 of the two electric field generating devices 1a becomes greater. The electric potential of each of the line electrodes 6a through 6n formed on the substrate 4 of the electric field generating device 1a is determined by the amount that the voltage drops as an electric current flows through the electric field generating resistor 5a. If the electric field generating resistors 5a of the two electric field generating devices 1a facing each other across the crystal layer 16 have uniform resistivity, the electric potentials of each pair of the line electrodes 6a through 6n of the two electric field generating devices 1a become substantially the same. However, since it is difficult to form the electric field generating resistors 5a with highly uniform resistivity, the electric potentials of each pair of the line electrodes 6a through 6n tend to become different. Even if the difference in resistivity of the electric field generating resistors 5a is only a few percent, the optical characteristics of the light deflecting device 13a may be degraded. Therefore, it is difficult to obviate the above problem solely by improving the uniformity in resistivity of the electric field generating resistors 5a. In this embodiment, to obviate the above problem, the corresponding line electrodes 6a, 6e, 6j, and 6n of the two electric field generating devices 1a are electrically connected to each other to make the electric potentials of each pair of the line electrodes 6a, 6e, 6j, and 6n, which form the left and right sides of the adjusting sections 12a through 12c, substantially the same. This configuration also makes it possible to reduce the difference between the electric potentials of each pair of the line electrodes other than the line electrodes 6a, 6e, 6j, and 6n and thereby to prevent the light passing through the light deflecting device 13a from being diffracted. Further, reducing the difference in electric potential suppresses the generation of vertical electric fields, making it possible to efficiently generate horizontal electric fields and to properly drive liquid crystal. In this embodiment, as described above, some of the line electrodes 6 in one electric field generating device 1a are positioned so as to face corresponding line electrodes 6 in the other electric field generating device 1a, and each pair of the facing line electrodes 6 are electrically connected to make their electric potentials substantially the same and thereby to suppress the generation of vertical electric fields. The light deflecting device 13a shown in FIGS. 9A through 9C may also include the adjusting resistance unit 3 connected to the electric field generating devices 1a as shown in FIG. 6A and FIG. 8. This configuration further improves the capability to make the potential gradients of the adjusting sections 12a through 12c uniform.

In this embodiment, the connectors 24 of the corresponding line electrodes 6a, 6e, 6j, and 6n of the two electric field generating devices 1a are electrically connected to each other by the leads 25 and the solder balls 26. Therefore, the size of each of the connectors 24 must be large enough to form the solder ball 26. However, since the line electrodes 6a through 6n are normally arranged closely, there is a risk of connecting adjacent line electrodes by the solder ball 26. To obviate this problem, it is preferable to make the line electrodes 6a, 6e, 6j, and 6n, which form the left and right sides of the adjusting sections 12a through 12c, longer than other line electrodes so that enough space is provided between the connectors 24. This configuration prevents mistakenly connecting adjacent line electrodes 6.

Figure 10A:
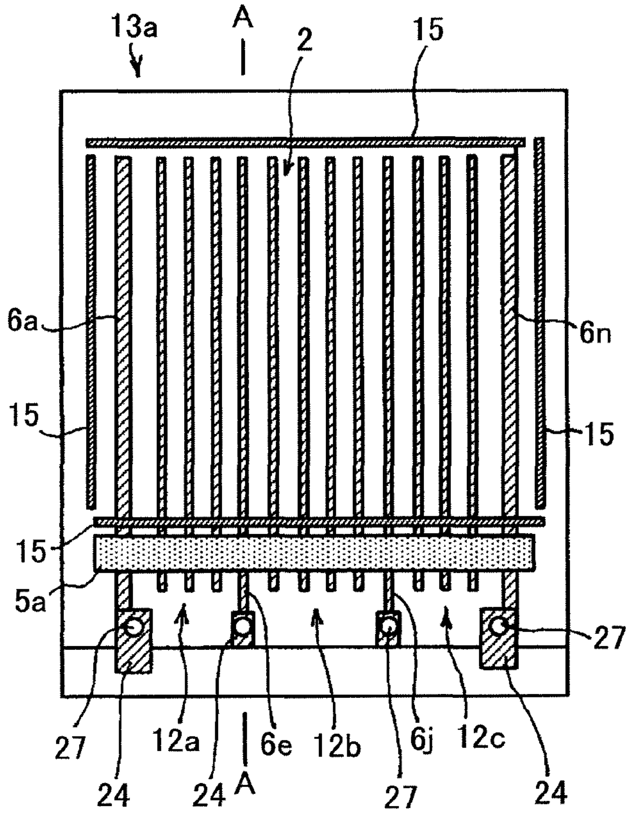
FIGS. 10A and 10B are drawings illustrating an exemplary configuration of a fifth light deflecting device.
Figure 10B:
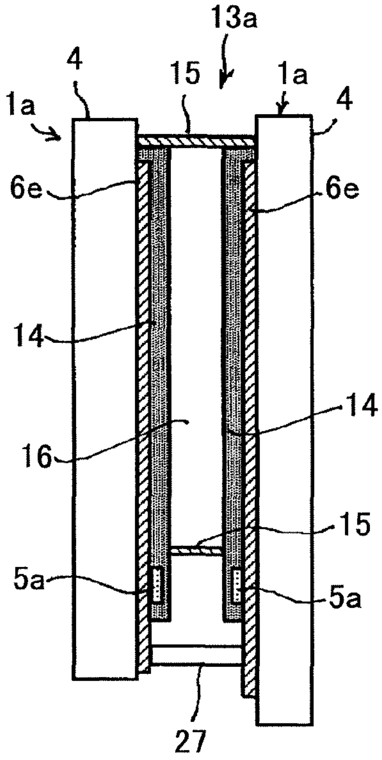

In the light deflecting device 13a shown in FIGS. 10A through 10B, the connectors 24 of the line electrodes 6a, 6e, 6j, and 6n of one of the two opposing electric field generating devices 1a and the corresponding connectors 24 of the line electrodes 6a, 6e, 6j, and 6n of the other one of the two opposing electric field generating devices 1a are positioned so as to face each other and electrically connected by conducting parts 27. The conducting parts 27 are preferably formed by filling the space between each pair of the corresponding line electrodes 6a, 6e, 6j, and 6n with a fluid conductive material such as a conductive paste and hardening the conductive material. Also, conductive films, metal poles, or spacer particles coated with metal may be used as the conducting parts 27. Connecting the pairs of line electrodes 6a, 6e, 6j, 6n by the conducting parts 27 instead of the leads 25 makes it possible to simplify the production process and to reduce the size of the light deflecting device 13a. A conductive paste is, for example, made of a thermosetting (or ultraviolet curing) resin mixed with a conductive filler. As a conductive filler, although carbon or copper may be used, silver that is not easily oxidized is preferable to improve resistance stability.

The thickness of the crystal layer 16 or the distance between the substrates 4 is determined by the width of the spacers 15 and is preferably made uniform throughout the effective area. Using a fluid material for the conducting parts 27 reduces the risk of changing the distance between the substrates 4 when forming the conducting parts 27, since the fluid material can be hardened after the substrates 4 are fixed at a predetermined distance from each other. Also, as described above, using the conducting parts 27 instead of the leads 25 makes it possible to simplify the production process and to reduce the size of the light deflecting device 13a.

The light deflecting device 13a shown in FIGS. 10A through 10B may also include the adjusting resistance unit 3 connected to the electric field generating devices 1a as shown in FIG. 6A and FIG. 8. This configuration further improves the capability to make the potential gradients of the adjusting sections 12a through 12c uniform.

Figure 11:
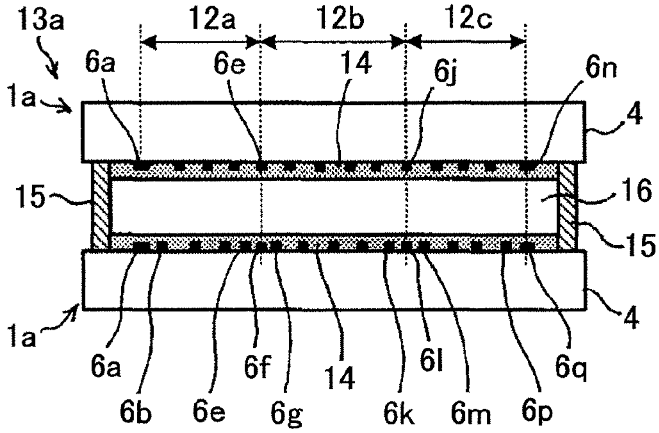
FIG. 11 is a drawing illustrating an exemplary configuration of a sixth light deflecting device.

In the above embodiment, the two sets of the line electrodes 6a through 6n of the two electric field generating devices 1a are formed in the opposing positions on the substrates 4. However, the line electrodes of the two electric field generating devices 1a may be arranged in different manners. In an example shown in FIG. 11, the line electrodes 6b through 6d, the line electrodes 6g through 6k, and the line electrodes 6m through 6p of one of the two electric field generating devices 1a are formed in positions between the line electrodes 6a through 6*n* of the other one of the electric field generating devices 1*a*. Even in this case, however, it is preferable to form the line electrodes 6*a*, 6*f*, 61, and 6*q* of one of the two electric field generating devices 1*a* and the line electrodes 6*a*, 6*e*, 6*j*, and 6*n* of the other one of the two electric field generating devices 1*a* in corresponding positions and to electrically connect each pair of the line electrodes 6*a*-6*a*, 6*e*-6*f*, 6*j*-6*l*, and 6*n*-6*q*. With the above configuration, the electric potentials in the areas between the line electrodes 6 of one of the electric field generating devices 1*a* are given by the line electrodes 6 of the other one of the electric field generating devices 1*a* and, as a result, the horizontal uniformity of electric fields is improved. In other words, the two sets of the line electrodes 6 of the two electric field generating devices 1*a* may be arranged at different pitches and such a configuration improves the horizontal uniformity of electric fields.

Figure 12:
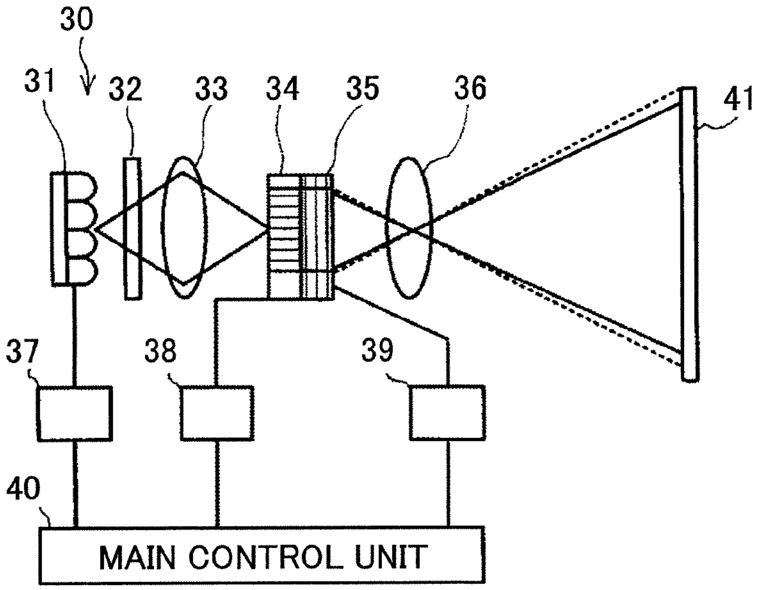
FIG. 12 is a drawing illustrating an exemplary configuration of an image display apparatus according to an embodiment of the present invention.

Next, an exemplary image display apparatus including the light deflecting device 13 or the light deflecting device 13*a* is described. As shown in FIG. 12, the optical system of an image display apparatus 30 includes a light source 31 with two-dimensionally-arrayed LED lamps, a diffuser 32, a condenser lens 33, a transmissive liquid crystal panel 34, a light deflecting unit 35 including the light deflecting device 13 or the light deflecting device 13*a*, and a projector lens 36. The diffuser 32, the condenser lens 33, the transmissive liquid crystal panel 34, the light deflecting unit 35, and the projector lens 36 are arranged in the order mentioned along the path of light emitted from the light source 31. The driving unit of the image display apparatus 30 includes a light source drive control unit 37 for driving the light source 31, a panel drive control unit 38 for driving the transmissive liquid crystal panel 34, a light deflection drive control unit 39 for driving the light deflecting unit 35, and a main control unit 40.

In the image display apparatus 30, the light source drive control unit 37 causes the light source 31 to emit illuminating light. The emitted illuminating light is converted by the diffuser 32 into uniform illuminating light and enters the condenser lens 33. The illuminating light passing through the condenser lens 33 critically illuminates the transmissive liquid crystal panel 34 that is controlled by the panel drive control unit 38 in synchronization with the light source 31. The transmissive liquid crystal panel 34 performs spatial light modulation on the illuminating light and outputs the spatially modulated light as image light to the light deflecting unit 35. The light deflecting unit 35 shifts the image light a certain distance in the array direction of pixels and outputs the shifted image light to the projection lens 36. The shifted image light is enlarged by the projection lens 36 and projected onto a screen 41.

The light deflecting unit 35 makes it possible to display image patterns on the screen 41, the display positions of which image patterns are shifted from each other by the deflection of light paths of subfields obtained by time-dividing an image field, and thereby to virtually increase the number of pixels of the transmissive liquid crystal panel 34. The amount of shift caused by the light deflecting unit 35 is set at one-half of the pixel pitch so that the image is intensified two-fold in the array direction of the pixels of the transmissive liquid crystal panel 34. Image signals for driving the transmissive crystal panel 34 are modified according to the amount of shift. Thus, the above embodiment makes it possible to stably display an apparently high-resolution image even with a liquid crystal panel with a small number of pixels.

EXAMPLE 1

The electric field generating resistors 5 were formed on two substrates 4 at the same time by depositing metal-oxide thin films having high transmittance for visible light. The surface resistivity values of the two electric field generating resistors 5 were $3.7\times10^8$ Ω/sq. and $6.0\times10^8$ Ω/sq. and showed a 1.5-fold difference. The transmittances of the electric field generating resistors 5 were 92% or higher.

The line electrodes 6*a* and 6*b* were formed on each of the electric field generating resistors 5. The resistance values of the two electric field generating resistors 5 in the area between the line electrodes 6*a* and 6*b* were 370 MQ and 600 MΩ. The electric field generating device 1 was produced by forming the low resistance layers 7 on the electric field generating resistor 5 so that the area between the line electrodes 6*a* and 6*b* is divided into eight sections 8 and by connecting metal film resistors (resistance value 10 MΩ, rated power SW, maximum working voltage 500 V) in parallel with the sections 8 as the adjusting resistors 9. Two electric field generating devices 1 were produced in this manner. The light deflecting device 13 shown in FIGS. 5A through 5C was produced by using the electric field generating devices 1 produced as described above. When a voltage of 2400 V was applied to the line electrodes 6*a* and 6*b* at the leftmost and rightmost ends of each of the electric field generating devices 1 of the light deflecting device 13, the voltage applied to each resistor was 300 V and the power consumption per resistor was 0.009 W.

When the line electrode 6*a* was grounded and a rectangular voltage with a frequency of 60 Hz and an amplitude of ±2400 V was applied to the line electrode 6*b*, the peak-to-peak value of the light path shift was about 6 μm. The response speed of the shift, which is the time necessary for the amount of shift to reach 90% of the saturation value after the polarity of the voltage is reversed, was 0.8 ms or shorter. Also, the response speed of the shift was measured using various electric field generating resistors 5 with surface resistivity values between $10^7$ Ω/sq. and $10^{11}$ Ω/sq. In all cases, the response speed of shift was shorter than 0.8 ms.

COMPARATIVE EXAMPLE 1

As in example 1, the electric field generating resistors 5 were formed on two substrates 4 at the same time by depositing metal-oxide thin films having high transmittance for visible light. The surface resistivity values of the two electric field generating resistors 5 were $3.7\times10^8$ ΩQ/sq. and $6.0\times10^8$ Ω/sq. and showed a 1.5-fold difference. In comparative example 1, electric field generating devices, each of which includes the line electrodes 6*a* and 6*b* on the electric field generating resistor 5 but does not include the low resistance layers 7 and the adjusting resistors 9, were produced, and the light deflecting device 13 as shown in FIGS. 5A through 5C was produced using the electric field generating devices. When the line electrode 6*a* was grounded and a rectangular voltage with a frequency of 60 Hz and an amplitude of ±2400 V was applied to the line electrode 6*b*, the peak-to-peak value of the light path shift was about 5 μm. The response speed of the light path shift near the line electrode 6*b* was about 0.5 ms and was substantially the same as that of the liquid crystal. However, the response speed near the midpoint between the line electrodes 6*a* and 6*b* was longer than 2 ms and the response speed near the line electrode 6*a* was about 4 ms. It is assumed that the response speed was slow because the resistance value between the line electrodes 6*a* and 6*b* was too high. When the resistance value is too high, the rise of electric fields in response to the polarity reversal of the voltage is delayed and therefore the movement of the liquid crystal driven by the electric fields is also delayed.

According to an experiment about the relationship between power consumption and heat generation, the power consumption per unit area of the electric field generating resistor 5 must be 0.02 W/cm$^2$ or lower to maintain the temperature rise of the liquid crystal layer 16 equal to or below 10° C. In other words, the resistance value between the line electrodes 6*a* and 6*b* must be 18 MΩ or lower. Also, to achieve the light path shift response speed of 0.8 ms or shorter throughout the effective area of the electric field generating resistor 5 without using the low resistance layers 7 and the adjusting resistors 9, the resistance value between the line electrodes 6*a* and 6*b* must be 100 MΩ or lower. To achieve such a resistance value, the surface resistivity of the electric field generating resistor 5 must be between $1.8\times10^7$ Ω/sq. and $1.0\times10^8$ Ω/sq. However, it is difficult to form a film with such surface resistivity by using a metal-oxide material. In the case of example 1, the response speed can be improved even when the resistance values of the electric field generating resistors 5 are inconsistent and therefore a metal-oxide film having high transmittance can be used for the electric field generating resistors 5. This, in turn, makes it possible to improve the production yield of the electric field generating device 1.

EXAMPLE 2

Depending on the material, the resistance value of the electric field generating resistor 5 may change greatly as time passes because of environmental factors such as temperature. The electric field generating resistor 5 was formed on the substrate 4 by depositing a metal-oxide thin film, for example, a zinc-oxide film, as described in example 1. The resistance value of the electric field generating resistor 5 was 500 MΩ. In example 2, the resistance circuits 18*a* through 18*c* (see FIG. 6A), each of which includes the adjusting resistor 19*a* (see FIG. 7) with a resistance value of 10 MΩ, the adjusting resistor 19*b* with a resistance value of 1 MΩ, and the switch 20, were connected to the adjusting resistance unit 3. The current detecting unit 23 (see FIG. 8) was also provided to detect the changes in the electric current flowing through the electric field generating resistor 5 and thereby to detect the changes in resistance value of the electric field generating resistor 5. In example 2, when the resistance value of the electric field generating resistor 5 is 800 MΩ or higher, the adjusting resistor 19*b* (1 MΩ) in each of the resistance circuits 18*a* through 18*c* is selected by the switch 20; when the resistance value of the electric field generating resistor 5 is higher than 100 MΩ and lower than 800 MΩ, the adjusting resistor 19*a* (10 MΩQ) is selected, and when the resistance value of the electric field generating resistor 5 is 100 MΩ or lower, neither of the adjusting resistors 19*a* and 19*b* is connected. The light deflecting device 13 was produced by using the electric field generating devices 1 produced as described above.

In the initial condition of the light deflecting device 13, the resistance value of the electric field generating resistor 5 was 500 MΩ and therefore the adjusting resistor 19*a* was selected by the switch 20. The resistance value of the zinc-oxide thin-film used for the electric field generating resistor 5 tends to monotonically increase as time passes. When the resistance value of the electric field generating resistor 5 reached 800 MΩ, the adjusting resistor 19*b* was selected by the switch 20. In this way, by switching the adjusting resistors by the switch 20, the light deflecting device 13 operated stably without any delay in light path shift.

EXAMPLE 3

The line electrodes 6*a* through 6*n* were formed in an area including the light path on one side of the substrate 4 made of a glass plate with a length of 6 cm, a width of 5 cm, and a thickness of 1 mm. The electric field generating resistor 5*a* shaped like a strip with a width of 4 mm and a thickness of 400 nm was formed along the edges of the line electrodes 6*a* through 6*n*. The distance between the line electrodes 6*a* and 6*n* at the leftmost and rightmost edges was 4 cm and the resistance value between the line electrodes 6*a* and 6*n* was 80 MΩ. Also, the area between the line electrodes 6*a* and 6*n* was divided into the adjusting sections 12*a* through 12*c* as shown in FIG. 6 and the adjusting resistors 9*a* through 9*c* were connected in parallel with the adjusting sections 12*a* through 12*c*. The maximum working voltage of the adjusting resistors 9*a* through 9*c* was 1 kV and the rated power was 0.4 W.

The light deflecting device 13*a* as shown in FIGS. 6A through 6C was produced by using the electric field generating devices 1*a* produced as described above. In the light deflecting device 13*a*, the electric field generating resistor 5*a* that generates heat is not in contact with the liquid crystal layer 16. Therefore, the light deflecting device 13*a* is less likely to be affected by the temperature rise than the light deflecting device 13 shown in FIG. 5 even if the power consumption is equal. According to an experiment, in the light deflecting device 13*a* of this example, a heat problem does not occur as long as the power consumption of the electric field generating resistor 5*a* is 0.06 W/cm$^2$ or lower. In other words, the heat problem does not occur when the resistance value of the electric field generating resistor 5*a* is 60 MΩ or higher. Also, to make the response speed of light path shift equal to or below 0.8 ms throughout the effective area, it is necessary to make the resistance value of each of the electric field generating resistor 5*a* and the adjusting resistor 3 equal to or below 100 MΩ.

Figure 13:
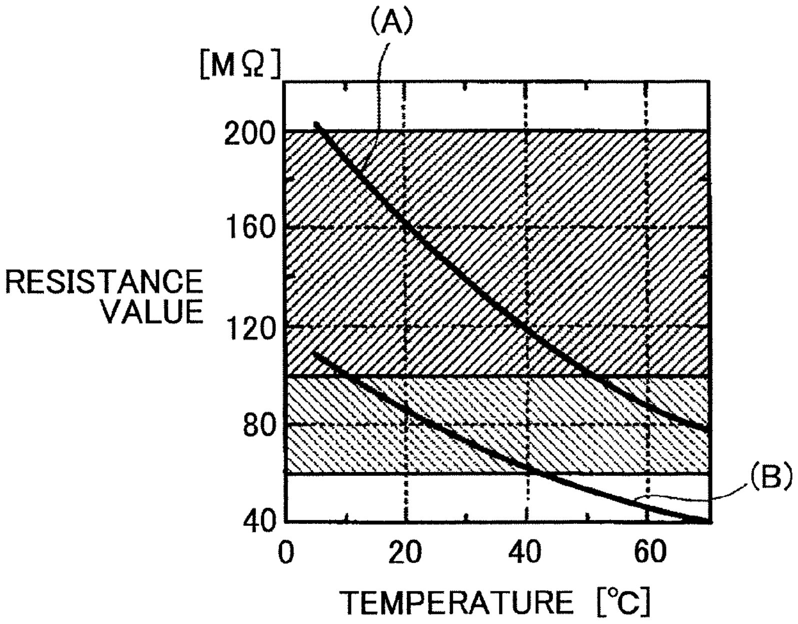
FIG. 13 is a graph showing changes in resistance value of the exemplary electric field generating resistor in relation to the temperature.

When a voltage with a frequency of 60 Hz and an amplitude of ±2400 V was applied to the line electrodes 6*a* and 6*n* at the leftmost and rightmost ends of the light deflecting device 13*a*, at a normal temperature, the peak-to-peak value of the light path shift was about 5 μm and the response speed was 0.55 ms or shorter throughout the effective area. Thus, the light deflecting device 13*a* worked normally. When the temperature of the light deflecting device 13*a* was changed between 5° C. and 70° C., the resistance value of the electric field generating resistor 5*a* decreased as the temperature increased. The resistance value of the electric field generating resistor 5*a* showed changes as shown in FIG. 13 (A). The results show that it is necessary to keep the resistance value of the electric field generating resistor 5*a* between 100 MΩ and 200 MΩ to make the response speed of the light path shift below 0.8 ms throughout the effective area of the light deflecting device 13*a* having the adjusting resistance unit 3. The light deflecting device 13*a* having the characteristics as described above worked stably in the temperature range of between 10° C. and 50° C.

COMPARATIVE EXAMPLE 2

A light deflecting device that has substantially the same configuration as that of the light deflecting device 13*a* described in example 3 but does not include the adjusting resistance unit 3 was prepared. When a voltage with a frequency of 60 Hz and an amplitude of ±2400 V was applied to the line electrodes 6*a* and 6*n* at the leftmost and rightmost ends of the light deflecting device, at a normal temperature, the peak-to-peak value of the light path shift was about 5 μm as in example 3 and the response speed was 0.55 ms or shorter throughout the effective area. Thus, the light deflecting device worked normally. When the temperature of the light deflecting device was changed between 5° C. and 70° C., the resistance value of the electric field generating resistor 5*a* changed as shown in FIG. 13 (B). The resistance value of the electric field generating resistor 5*a* at 10° C. was about 101 MΩ and substantially equal to the upper limit of the resistance value. However, at 50° C., the resistance value became about 54 MΩ that is below the lower limit. The results show that thermal runaway may occur depending on the use environment of the light deflecting device.

EXAMPLE 4

The line electrodes 6 were formed in an area including the light path on one side of the substrate 4 made of a glass plate with a length of 6 cm, a width of 5 cm, and a thickness of 1 mm. The width of each of the line electrodes 6 was 10 μm and 400 line electrodes 6 were arranged at 100 μm pitch. Three of the line electrodes 6 at the 200th position and the leftmost and rightmost ends were made longer than the other line electrodes 6. One end of each of the three line electrodes 6 was widened to 2 mm to form the connector 24. The line electrodes 6 were connected in series by the electric field generating resistor 5*a*. The surface of the substrate 4 where the line electrodes 6 were formed was processed with a vertical alignment agent. In this manner, two substrates 4 were prepared. A thermosetting adhesive mixed with spacers 15 with a particle diameter of 50 μm was applied onto two side areas outside of a 4 cm×4 cm area on one of the substrates 4. The two substrates 4 were joined so that the line electrodes 6 of the two substrates 4 face each other across the crystal layer 16. The thermoset adhesive was heated to a specified temperature and was thereby hardened. In example 4, the spacers 15 and the electric field generating resistors 5*a* were thus placed outside of the 4 cm×4 cm effective area. Then, the light deflecting device 13*a* was produced by injecting a ferroelectric liquid crystal into the space between the substrates 4 by a capillary method. An AC power supply was connected to the connectors 24 of the line electrodes 6 at the leftmost and rightmost ends of the light deflecting device 13*a*. Also, the line electrodes 6 at the 200th positions of the two substrates 4 were connected by a lead.

A mask pattern made of lines with a 5 μm width and spaced at 5 μm intervals was placed on the incidence side of the light deflecting device 13*a*. The light deflecting device 13*a* was illuminated with linearly-polarized light through the mask pattern. The direction of the linearly-polarized light was the same as the length direction of the line electrodes 6. Then, the light that passed through the mask pattern was observed by a microscope. When there were no electric fields, the mask pattern was observed without any change. When a first one of the leftmost and rightmost line electrodes 6 was grounded and a +2400 V voltage was applied to a second one of the leftmost and rightmost line electrodes 6, the line-space pattern was shifted about 2.5 μm in the length direction of the line electrodes 6. When a −2400 V voltage was applied to the first one of the leftmost and rightmost line electrodes 6, the line-space pattern was shifted about 2.5 μm in the opposite direction. Further, when a rectangular voltage with a frequency of 60 Hz and an amplitude of +2400 V was applied to the second one of the leftmost and rightmost line electrodes 6, the peak-to-peak value of the light path shift was about 5 μm. Since the width of the lines and spaces were 5 μm, it appeared as if the bright and dark parts made of the lines and spaces were inverted. Assuming that the spaces are pixels of a light bulb, this means that the number of pixels were virtually doubled. In this example, the fluctuation in the amount of shift measured at several points in the effective area of the light deflecting device 13*a* was ±5% of the average value 2.5 μm.

Next, a mask pattern with a line parallel to the length direction of the line electrodes 6 was placed on the incidence side of the light deflecting device 13*a* and the light deflecting device 13*a* was illuminated with linearly-polarized light through the mask pattern. The light passed through the light deflecting device 13*a* was projected onto a screen. When the light deflecting device 13*a* was activated, ghost images appeared on the left and right sides of the line. When the light deflecting device 13*a* was deactivated, the ghost images disappeared. This indicates that the light is diffracted because of the refractive index modulation in the parts of the liquid crystal line corresponding to the electrodes 6. When the lead connecting the 200th line electrodes 6 was temporarily cut, the intensity of the ghost images while the light deflecting device 13*a* was activated increased about twofold. This result indicates that the diffraction effect can be reduced by providing two sets of the adjusting sections 12.

EXAMPLE 5

The light deflecting device 13*a* was prepared in substantially the same manner as in example 4. In example 5, however, every 80th line electrode 6, six in total, was made longer than the other line electrodes 6 and one edge of each of the six line electrodes 6 was widened to 2 mm. Thus, five adjusting sections each corresponding to 80 line electrodes 6 were formed in each of the two electric field generating devices 1*a*. Each pair of the six line electrodes 6 of the two electric field generating devices 1*a* was connected by the lead 25 as shown in FIG. 9. A voltage was activated by applying a voltage to the light deflecting device 13*a* and the fluctuation in the amount of shift was observed. The result was substantially the same as in example 4. In example 5, no ghost image appeared in the projected image even when the light deflecting device 13*a* was activated. This result indicates that the five adjusting sections 12 reduced the potential difference between the substrates 4 to an extent that the diffraction effect was unrecognizable by human eyes.

EXAMPLE 6

In example 6, five adjusting sections 12 were formed on a first substrates 4 as in example 5. On a second substrates 4, the line electrodes 6 were also formed basically at 100 μm pitch but shifted a half pitch so that the line electrodes 6 were positioned between those of the first substrate 4 when the first and second substrates 4 were joined. In some parts, the pitch between the line electrodes 6 of the second substrate 4 was changed so that the line electrodes 6 forming the left and right sides of the adjusting sections 12 of the first and second substrates 4 were placed in opposing positions. The electric field generating resistor 5*a* was formed on each of the first and second substrates 4 and a thermosetting adhesive mixed with spacers 15 with a particle diameter of 50 μm was applied onto two side areas outside of a 4 cm×4 cm area on one of the first and second substrates 4. A dot of thermosetting conductive paste was dispensed onto the edge of each of the line electrodes 6 forming the left and right sides of the adjusting sections 12. The first and second substrates 4 were joined and the adhesive and the conductive paste were hardened by heating them to specified temperatures. Then, the light deflecting device 13*a* was produced by injecting a ferroelectric liquid crystal into the space between the substrates 4 by a capillary method.

The line-space pattern coming out from the light deflecting device 13*a* was observed as in the above examples. The fluctuation in the amount of shift was within ±3% of the average value and the uniformity of the amount of shift in the effective area of the light deflecting device 13*a* of example 6 was better than that of the light deflecting device 13*a* of example 5. The results show alternately placing the line electrodes 6 of the two substrates 4 improves the uniformity of horizontal electric fields and thereby reduces the fluctuation in the amount of shift. As in example 5, the diffraction effect was sufficiently reduced and no ghost image appeared in the projected image. Also, by connecting the line electrodes 6 of the two substrates 4 with the conductive paste, the size of the light deflecting device 13*a* was reduced to about 80% of the size of the light deflecting device 13*a* in examples 4 and 5. Further, since soldering and wiring were not necessary, the production process was simplified.

EXAMPLE 7

The image display apparatus 30 shown in FIG. 12 was produced with the light deflecting device 13*a*. In example 7, an XGA (1024×768 dots) panel is used as the liquid crystal panel 34 and a microlens array was used as the condenser lens 33 to increase the light condensing power. RGB LED light sources are used as the light source 31 and a field sequential method, which forms a color image by switching at a high speed the colors of light to illuminate the liquid crystal panel 34, was employed. The frame frequency for image display was set at 60 Hz and the subfield frequency was set at 240 Hz that is fourfold of the frame frequency to increase the number of pixels fourfold by pixel shift. One subframe was divided into three colors by switching images corresponding to the three colors at 720 Hz and by turning on and off the RGB LED light sources in the light source 31 in synchronization with the timing when the three color images were displayed in the liquid crystal panel 34 so that a viewer can see a full color image.

The thickness of the spacers 15 in the light deflecting device 13*a* was set at 90 μm to shift the light path about 9 μm. The connectors of the line electrodes 6*a* and 6*n* were connected to a power supply for supplying a rectangular voltage of ±2400 V. In the image display apparatus 30 of example 7, two light deflecting devices 13*a* were used. One of the two light deflecting devices 13*a* was positioned at the incoming side as a first light deflecting device and the other one of the two light deflecting devices 13*a* was positioned at the outgoing side as a second light deflecting device. The first and second light deflecting devices were arranged so that the length directions of the line electrodes of the first and second light deflecting devices become mutually perpendicular and match the array directions of pixels of the liquid crystal panel 34. Also, a polarization plane rotation device was provided between the first and the second light deflecting devices. The polarization plane rotation device rotates 90 degrees the polarization plane of the light output from the first light deflecting device so that the polarization plane matches the deflection direction of the second light deflection device.

The frequency of the rectangular voltages used to drive the first and second light deflecting devices was set at 120 Hz. The vertical and horizontal phases of the first and second light deflecting devices were shifted 90 degrees and the drive timings were thereby determined so that the pixels were shifted in four directions.

With the image display apparatus 30 configured as described above, a high-resolution image was successfully displayed by rewriting the subfield images displayed in the crystal panel 34 at 240 Hz and thereby virtually increasing the number of pixels fourfold in the vertical and horizontal directions.

An embodiment of the present invention provides a light deflecting device in which some of line electrodes formed on an electric field generating device are electrically controlled via electrical connectors to better perform light deflection and an image display apparatus including the light deflecting device.

Embodiments of the present invention make it possible to provide a compact electric field generating device that can stably generate substantially uniform electric fields between line electrodes on the substrate at a high response speed; a light deflecting device including the electric field generating device which light deflecting device can uniformly deflect light and reduce diffraction effects without compromising contrast of an image; and an image display apparatus including the light deflecting device.

An embodiment of the present invention also makes it possible to reduce heat generation of an electric field generating device and thereby to provide an electric field generating device that can generate substantially uniform electric fields without being affected by temperature or other conditions.

An embodiment of the present invention makes it possible to reduce the influence of uneven resistance in an electric field generating device.

An embodiment of the present invention provides a light deflecting device in which some of line electrodes formed on an electric field generating device are electrically controlled via electrical connectors to better perform light deflection and an image display apparatus including the light deflecting device.

In an electric field generating device according to an embodiment of the present invention, multiple line electrodes are formed on one side of a substrate so as to divide the area on the substrate into multiple sections, an electric forming resistor shaped like a strip is formed on the line electrodes so as to contact parts of the line electrodes, and a voltage is applied to some of the line electrodes to generate electric fields along the plane of the substrate. This configuration makes it possible to generate substantially uniform electric fields throughout a wide area and to reduce the rise of temperature of the substrate.

According to an embodiment of the present invention, electric connectors are formed in some of the line electrodes. Those electric connectors make it easier to electrically connect the some of the line electrodes.

Also, the some of the line electrodes are made longer than other line electrodes to make it easier to electrically connect the some of the line electrodes and to prevent wrong line electrodes from being connected.

Further, one or more line electrodes may be provided between the some of the line electrodes. This configuration makes it possible to make the potential gradients between the some of the electrodes substantially uniform and thereby to generate stable electric fields.

When an electric field generating resistor of an electric field generating device is formed as a thin-film resistor, there is a possibility that capacitance components are formed at grain boundaries of the crystal grains constituting the thin-film resistor. Such capacitance components may delay the rise of electric fields. Also, the resistance values of thin-film resistors vary even under the same deposition conditions, lowering the production yield of electric field forming devices. In an electric field generating device according to an embodiment of the present invention, an adjusting resistance unit is provided to reduce the difference in resistance values of thin-film resistors and to improve the rise time of electric fields. Such a configuration makes it possible to form an electric field generating resistor as a thin-film resistor, to increase the flexibility of selecting a material for the electric field generating resistor, and thereby to improve the production yield of electric field forming devices.

An electric field generating device according to an embodiment of the present invention may include an adjusting resistance unit that includes adjusting resistors connected to the connectors of some of the line electrodes in parallel with the sections of the electric field generating resistor. This configuration makes it possible to reduce the combined resistance values of the sections of the electric field generating resistor and to reduce the rise time of electric fields.

According to an embodiment of the present invention, the resistance values of the adjusting resistors connected in parallel with the sections of the electric field generating resistor are determined so that the combined resistance values of the adjusting resistors and the corresponding sections become proportional to the widths of the sections. This configuration makes it possible to make the potential gradients in the sections substantially uniform and thereby to generate substantially uniform electric fields.

According to an embodiment of the present invention, the resistance value of the adjusting resistor is changeable or the adjusting resistor is composed of multiple resistors that can be switched by a switching unit. This configuration makes it possible to make the combined resistance values and potential gradients in the sections substantially uniform and thereby to generate substantially uniform electric fields even if the resistance values in the electric field generating resistor are not uniform.

In an electric field generating device according to an embodiment of the present invention, the temperature near the electric field generating resistor of the electric forming unit and/or the electric current flowing through the electric field generating resistor are measured and the resistance values of the adjusting resistors are changed according to the measured temperature or the electric current. This configuration makes it possible to form stable electric fields having high response speed without being affected by the changes in temperature, electric current, and surrounding environment.

An embodiment of the present invention provides a light deflecting device where a liquid crystal layer that forms a chiral smectic C phase is sandwiched between two electric field generating devices as described above. Such a light deflecting device responds quickly and is able to stably deflect light.

In a light deflecting device according to an embodiment of the present invention, line electrodes having connectors of a first electric field generating device are connected via the connectors to line electrodes of a second electric field generating device that are positioned so as to face those of the line electrodes of the first electric field generating device. This configuration makes it possible to make the electric potentials of each pair of the line electrodes of the first and second electric field generating devices substantially uniform and thereby to reduce the potential difference between corresponding sections of the first and second electric field generating devices. This, in turn, makes it possible to suppress diffraction by the light deflecting device, to suppress the generation of vertical electric fields, and thereby to efficiently generate horizontal electric fields. Thus, this embodiment makes it possible to efficiently drive the liquid crystal.

According to an embodiment of the present invention, line electrodes having no connectors of the first and second electric field generating devices are placed in alternate positions or in different light paths. This configuration further improves the uniformity of electric fields in the horizontal direction and thereby makes it possible to stably drive the liquid crystal.

According to an embodiment of the present invention, each pair of the line electrodes having connectors of the first and second electric field generating devices are electrically connected by a conducting part that is formed by hardening a fluid conductive material injected into the space between the pair of the line electrodes. This configuration eliminates the need to connect the line electrodes by, for example, leads and thereby makes it possible to simplify the production process and to reduce the size of the electric field generating device.

In an image display apparatus including a light deflecting device as described above, light emitted from an image display device, which can control light according to image information and has a two-dimensional array of pixels, is deflected and then projected onto a screen. This configuration makes it possible to display a high-resolution image using an image display device with a small number of pixels.

The present invention is not limited to the specifically disclosed embodiments, and variations and modifications may be made without departing from the scope of the present invention.

The present application is based on Japanese Priority Application No. 2006-068683 filed on Mar. 14, 2006 and Japanese Priority Application No. 2006-350754 filed on Dec. 27, 2006, the entire contents of which are hereby incorporated herein by reference.

What is claimed is:

1. An electric field generating device comprising:

an electric field generating unit including a substrate, line electrodes, and an electric field generating resistor and configured to generate an electric field, wherein the line electrodes are formed on at least one side of the substrate in parallel with each other so as to divide the side of the substrate into multiple sections, the electric field generating resistor is shaped like a strip and positioned so as to touch a part of each of the line electrodes, and some of the line electrodes have connectors for electric connection and are longer than other ones of the line electrodes having no connectors.

2. An electric field generating device comprising:

an electric field generating unit including a substrate, line electrodes, and an electric field generating resistor and configured to generate an electric field, wherein the line electrodes are formed on at least one side of the substrate in parallel with each other so as to divide the side of the substrate into multiple sections, the electric field generating resistor is shaped like a strip and positioned so as to touch a part of each of the line electrodes, some of the line electrodes have connectors for electric connection and are arranged so as to divide the electric field generating resistor into adjusting sections and at least one of other ones of the line electrodes having no connectors is positioned between each pair of the some of the line electrodes.

3. The electric field generating device as claimed in claim 1, wherein the electric field generating resistor is a thin-film resistor.

4. The electric field generating device as claimed in claim 2, further comprising:

an adjusting resistance unit including adjusting resistors that are connected to the connectors of the some of the line electrodes so as to be connected in parallel with the adjusting sections.

5. The electric field generating device as claimed in claim 4, wherein a resistance value of each of the adjusting resistors is determined so that a combined resistance value of said each of the adjusting resistors and a corresponding one of the adjusting sections that is connected in parallel with said each of the adjusting resistors becomes proportional to a width of said corresponding one of the adjusting sections.

6. The electric field generating device as claimed in claim 4, wherein a resistance value of each of the adjusting resistors is changeable.

7. The electric field generating device as claimed in claim 4, wherein each of the adjusting resistors includes multiple resistors and a switching unit configured to switch the multiple resistors.

8. The electric field generating device as claimed in claim 7, further comprising:

a temperature measuring unit configured to measure a temperature near the electric field generating resistor; and a controller configured to cause the switching unit to switch the multiple resistors based on the measured temperature.

9. The electric field generating device as claimed in claim 7, further comprising:

an electric current measuring unit configured to measure an electric current flowing through the electric field generating resistor; and a controller configured to cause the switching unit to switch the multiple resistors based on the measured electric current.

10. The electric field generating device as claimed in claim 7, further comprising:

a temperature measuring unit configured to measure a temperature near the electric field generating resistor;

an electric current measuring unit configured to measure an electric current flowing through the electric field generating resistor; and a controller configured to cause the switching unit to switch the multiple resistors based on the measured temperature and the measured electric current.

11. A light deflecting device, comprising:

a first electric field generating device including a first electric field generating unit including a first substrate, first line electrodes, and a first electric field generating resistor and configured to generate a first electric field, wherein the first line electrodes are formed on at least one side of the first substrate in parallel with each other so as to divide the side of the first substrate into first multiple sections, the first electric field generating resistor is shaped like a strip and positioned so as to touch a part of each of the first line electrodes, and some of the first line electrodes have first connectors for electric connection and are longer than other ones of the first line electrodes having no first connectors;

a second electric field generating device including a second electric field generating unit including a second substrate, second line electrodes, and a second electric field generating resistor and configured to generate a second electric field, wherein the second line electrodes are formed on at least one side of the second substrate in parallel with each other so as to divide the side of the second substrate into second multiple sections, the second electric field generating resistor is shaped like a strip and positioned so as to touch a part of each of the second line electrodes, and some of the second line electrodes have second connectors for electric connection and are longer than other ones of the second line electrodes having no second connectors, the first and second electric field generating devices being arranged at a distance so as to face each other; and a liquid crystal layer sandwiched between the first and second electric field generating devices which liquid crystal layer is made of a liquid crystal that forms a chiral smectic C phase.

12. The light deflecting device as claimed in claim 11, wherein the some of the first line electrodes of the first electric field generating device are positioned so as to substantially face the some of the second line electrodes of the second electric field generating device.

13. The light deflecting device as claimed in claim 11, wherein each of the first connectors of the some of the first line electrodes of the first electric field generating device are electrically connected to a corresponding one of the second connectors of the some of the second line electrodes of the second electric field generating device.

14. The light deflecting device as claimed in claim 11, wherein the first line electrodes of the first electric field generating device other than the some of the first line electrodes and the second line electrodes of the second electric field generating device other than the some of the second line electrodes are placed in different light paths.

15. The light deflecting device as claimed in claim 11, wherein each of the some of the first line electrodes of the first electric field generating device is electrically connected to a corresponding one of the some of the second line electrodes of the second electric field generating device by a conducting part that is formed by hardening a fluid conductive material injected into a space between said each of the some of the first line electrodes and the corresponding one of the some of the second line electrodes.

16. An image display apparatus, comprising:

an image display device having a two-dimensional array of pixels and configured to control light according to image information;

an illumination optical system configured to illuminate the image display device;

a light deflecting device configured to deflect light emitted from the image display device, the light deflecting device including a first electric field generating device which includes a first electric field generating unit including a first substrate, first line electrodes, and a first electric field generating resistor and configured to generate a first electric field, wherein the first line electrodes are formed on at least one side of the first substrate in parallel with each other so as to divide the side of the first substrate into first multiple sections, the first electric field generating resistor is shaped like a strip and positioned so as to touch a part of each of the first line electrodes, and some of the first line electrodes have first connectors for electric connection and are longer than other ones of the first line electrodes having no first connectors, a second electric field generating device which includes a second electric field generating unit including a second substrate, second line electrodes, and a second electric field generating resistor and configured to generate a second electric field, wherein the second line electrodes are formed on at least one side of the second substrate in parallel with each other so as to divide the side of the second substrate into second multiple sections, the second electric field generating resistor is shaped like a strip and positioned so as to touch a part of each of the second line electrodes, and some of the second line electrodes have second connectors for electric connection and are longer than other ones of the second line electrodes having no second connectors, the first and second electric field generating devices being arranged at a distance so as to face each other, and a liquid crystal layer sandwiched between the first and second electric field generating devices which liquid crystal layer is made of a liquid crystal that forms a chiral smectic C phase; and a projection optical system configured to project the deflected light, wherein the light deflecting device is positioned between the image display device and the projection optical system.

* * * * *